US011631006B2

(12) United States Patent
Koyama

(10) Patent No.: US 11,631,006 B2
(45) Date of Patent: Apr. 18, 2023

(54) OPTIMIZATION DEVICE AND CONTROL METHOD OF OPTIMIZATION DEVICE

(71) Applicant: FUJITSU LIMITED, Kawasaki (JP)

(72) Inventor: Jumpei Koyama, Setagaya (JP)

(73) Assignee: FUJITSU LIMITED, Kawasaki (JP)

(*) Notice: Subject to any disclaimer, the term of this patent is extended or adjusted under 35 U.S.C. 154(b) by 363 days.

(21) Appl. No.: 16/937,643

(22) Filed: Jul. 24, 2020

(65) Prior Publication Data
US 2021/0049475 A1 Feb. 18, 2021

(30) Foreign Application Priority Data

Aug. 14, 2019 (JP) .............................. JP2019-148763

(51) Int. Cl.
*G06N 3/126* (2023.01)
*G05B 13/02* (2006.01)
(Continued)

(52) U.S. Cl.
CPC ........... *G06N 3/126* (2013.01); *G05B 13/021* (2013.01); *G05D 23/1917* (2013.01);
(Continued)

(58) Field of Classification Search
CPC ................. G06N 3/126; G06N 13/021; G05D 23/1917; G06F 7/588; G06F 7/005
See application file for complete search history.

(56) References Cited

U.S. PATENT DOCUMENTS 5,533,168 A * 7/1996 Abe .................. G06Q 10/04
706/19
2003/0144748 A1* 7/2003 Nakamura ........... G05B 13/024
700/28
(Continued)

FOREIGN PATENT DOCUMENTS

EP         3660705 A1     6/2020
JP      H09-231197 A      9/1997
(Continued)

OTHER PUBLICATIONS

Satoshi Matsubara et al. "Ising-Model Optimizer with Parallel-Trial Bit-Sieve Engine" Springer International Publishing AG 2018.*
(Continued)

*Primary Examiner* — Vincent H Tran
(74) *Attorney, Agent, or Firm* — Fujitsu Patent Center

(57) ABSTRACT

An optimization device includes: a plurality of search parts; and a controller that controls the plurality of search parts, wherein, each of the plurality of search parts includes a state holding part configured to hold each of values of a plurality of state variables included in an evaluation function representing an energy value, an energy calculation part configured to calculate a change value of the energy value generated in a case where any one of the values of the plurality of state variables is changed, and a transition controller configured to stochastically determine whether or not to accept a state transition by a relative relation between the change value of the energy value and thermal excitation energy, based on a set temperature value, the change value, and a random number value.

8 Claims, 15 Drawing Sheets

(51) Int. Cl.
  *G05D 23/19*   (2006.01)
  *G06F 7/58*    (2006.01)
  *G06N 5/01*    (2023.01)
  *G06N 7/01*    (2023.01)

(52) U.S. Cl.
  CPC .............. *G06F 7/588* (2013.01); *G06N 5/01* (2023.01); *G06N 7/01* (2023.01)

(56) References Cited

U.S. PATENT DOCUMENTS

| | | | |
|---|---|---|---|
| 2016/0118106 A1* | 4/2016 | Yoshimura | G11C 7/04 365/156 |
| 2018/0005114 A1 | 1/2018 | Tomita et al. | |
| 2018/0107172 A1* | 4/2018 | Takatsu | G05D 23/1917 |
| 2019/0130295 A1* | 5/2019 | Okuyama | G06F 17/11 |
| 2019/0278829 A1 | 9/2019 | Takatsu | |
| 2019/0286077 A1 | 9/2019 | Koyama et al. | |
| 2020/0090026 A1 | 3/2020 | Shibasaki | |
| 2021/0049475 A1* | 2/2021 | Koyama | G05B 13/021 |
| 2021/0117188 A1* | 4/2021 | Okuyama | G06N 7/005 |

FOREIGN PATENT DOCUMENTS

| | | |
|---|---|---|
| JP | 2018-5541 A | 1/2018 |
| JP | 6465231 B1 | 2/2019 |

OTHER PUBLICATIONS

European Office Action dated Apr. 28, 2021 for corresponding European Patent Application No. 20186937.7, 3 pages. *Please note US-2016/0118106-A1 cited herewith, was previously cited in an IDS filed on Feb. 17, 2021.*.

Extended European Search Report dated Dec. 18, 2020 for corresponding European Patent Application No. 20186937.7, 5 pages.

* cited by examiner

FIG. 2
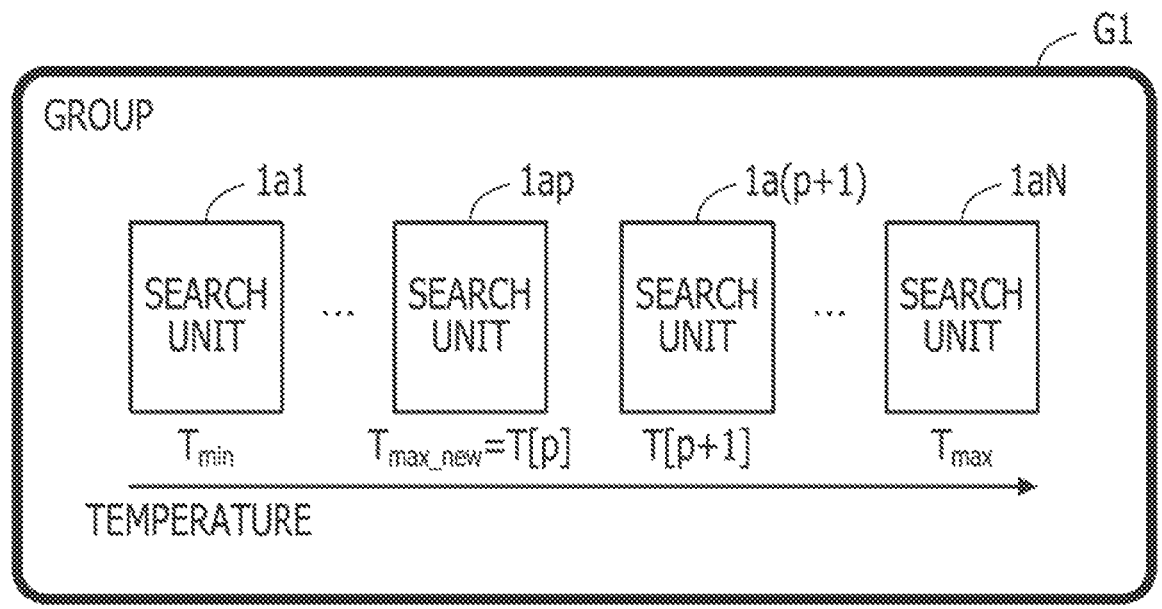
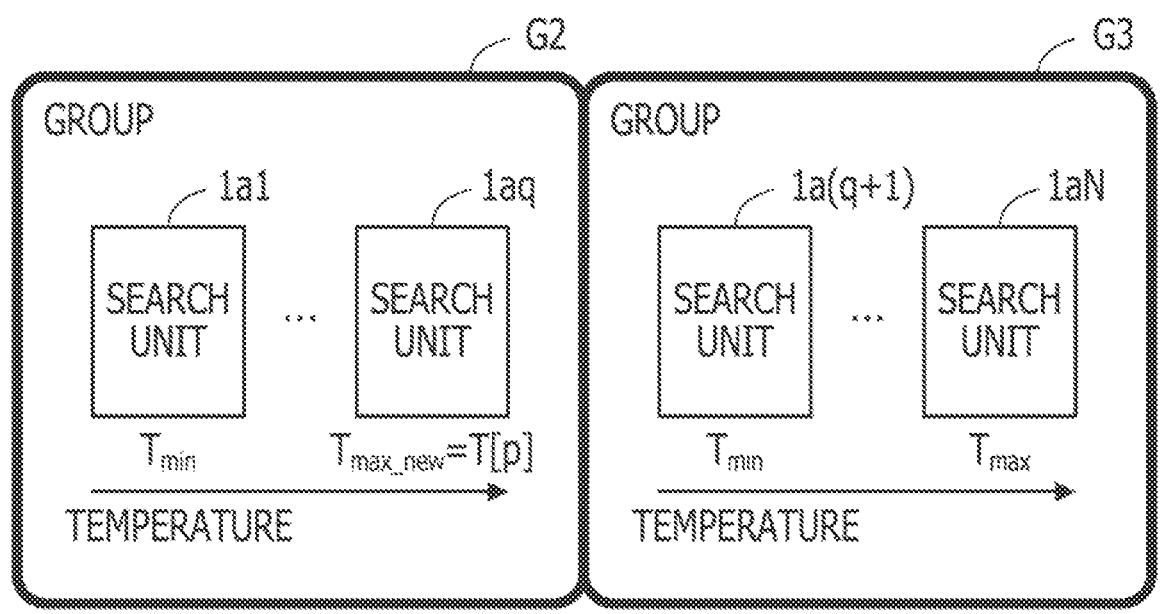

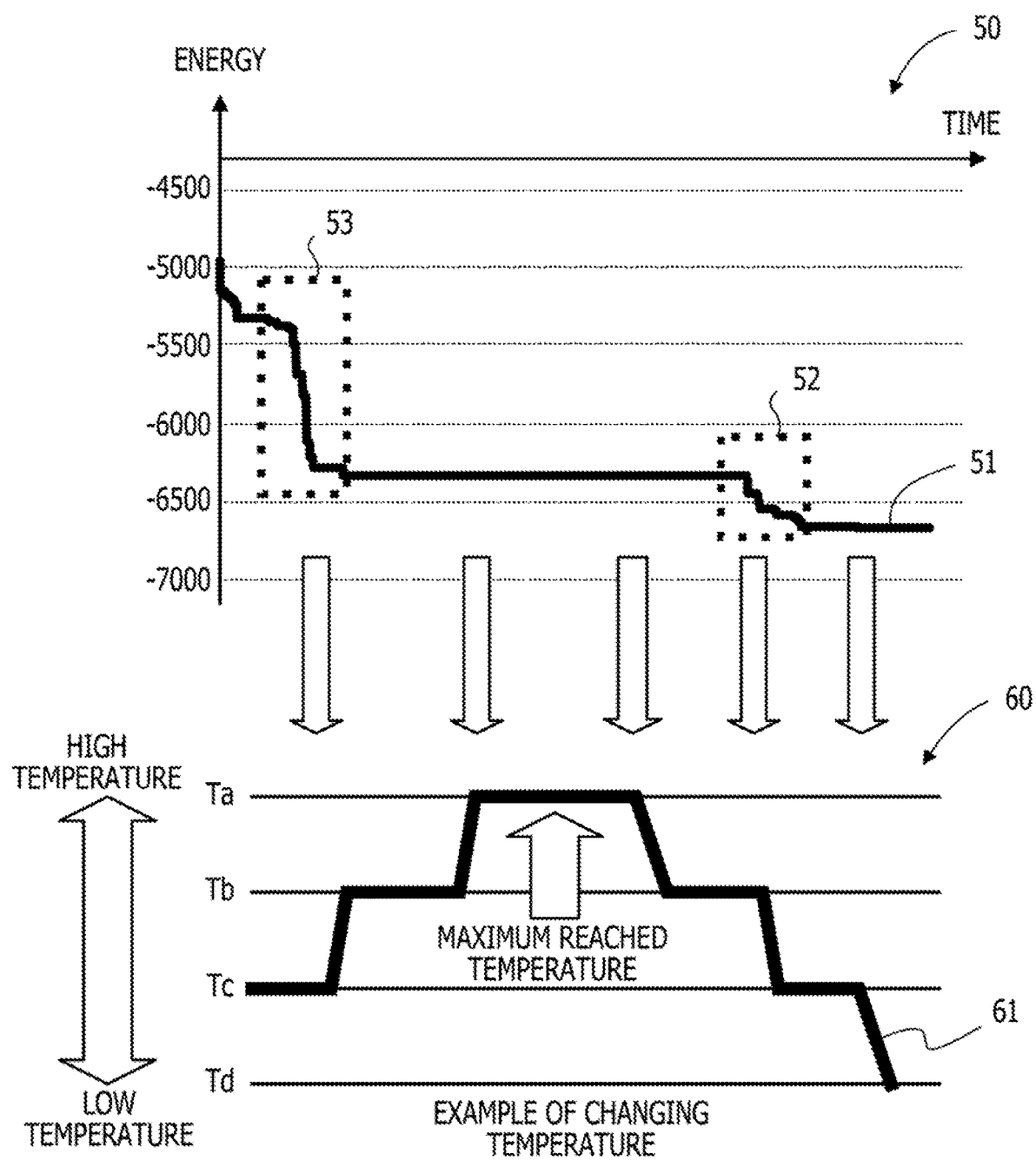

OPTIMIZATION DEVICE AND CONTROL METHOD OF OPTIMIZATION DEVICE

CROSS-REFERENCE TO RELATED APPLICATION

This application is based upon and claims the benefit of priority of the prior Japanese Patent Application No. 2019-148763, filed on Aug. 14, 2019, the entire contents of which are incorporated herein by reference.

FIELD

The embodiments discussed herein are related to an optimization device and a control method of the optimization device.

BACKGROUND

As a method of solving an optimization problem of various variables which is not easily handled by a Neumann-type computer, there is an optimization device (also referred to as an Ising machine or a Boltzmann machine) using an Ising-type energy function (also referred to as a cast function or an objective function). The optimization device calculates a problem of a calculation target by replacing the problem with an Ising model which is a model representing a behavior of spin of a magnetic material.

Related art is disclosed in Japanese Patent No. 6465231, Japanese Laid-open Patent Publication No. 2018-5541 and Japanese Laid-open Patent Publication No. 9-231197.

SUMMARY

According to an aspect of the embodiments, an optimization device includes: a plurality of search parts; and a controller that controls the plurality of search parts, wherein, each of the plurality of search parts includes a state holding part configured to hold each of values of a plurality of state variables included in an evaluation function representing an energy value, an energy calculation part configured to calculate a change value of the energy value generated in a case where any one of the values of the plurality of state variables is changed, and a transition controller configured to stochastically determine whether or not to accept a state transition by a relative relation between the change value of the energy value and thermal excitation energy, based on a set temperature value, the change value, and a random number value, the controller includes a temperature adjustment part configured to determine an update maximum temperature value based on information obtained by a ground state search in the plurality of search parts, a selection part configured to divide the plurality of search parts into a plurality of groups including at least a first group and a second group, based on the determined update maximum temperature value, a temperature controller configured to set the temperature value in a search part belonging to each of the plurality of groups, and an exchange controller configured to exchange the temperature values or the values of the plurality of state variables among search parts belonging to the same group, after the ground state search for the energy value is performed a repetitive number of times or after a predetermined period has elapsed from the ground state search for the energy value, the temperature adjustment part determines the update maximum temperature value based on a result of the ground state search performed by the search part included in the first group, and the selection part determines the temperature value set in the search part included in the second group, based on the determined update maximum temperature value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of grouping search units.

FIG. 4 is a diagram illustrating an example of changing the lowest energy.

DESCRIPTION OF EMBODIMENTS

The optimization device may also be modeled by using, for example, a neural network. In this case, each of a plurality of bits corresponding to a plurality of spins included in the Ising model functions as a neuron that outputs 0 or 1 in accordance with a weighting coefficient (also referred to as a coupling coefficient) corresponding to the magnitude of interaction between other bits and the own bits. The optimization device obtains, as an optimum solution, a combination of values of the respective bits from which a minimum value of the energy function (referred to as energy) described above, by using a stochastic search method such as simulated annealing.

For example, there is a proposal of an optimization device (or an information processing apparatus) that searches for a solution of an optimization problem by using an exchange Monte Carlo method or a replica exchange method, which is a kind of an extended ensemble method. In addition, there is also a proposal of a thermostatic chamber device for temperature parallel simulated annealing in which a state obtained by simulated annealing at a first temperature is stochastically exchanged with a state obtained by simulated annealing at a second temperature.

In a case where a stochastic search is performed by a plurality of search units in which temperatures are set as in the replica exchange method, it is desirable to appropriately control the temperature set in the search unit, In one aspect, an optimization device capable of controlling a temperature set in a search unit and a control method of the optimization device may be provided.

Hereinafter, embodiments will be described with reference to the drawings.

First Embodiment

A first embodiment will be described.

Figure 1:
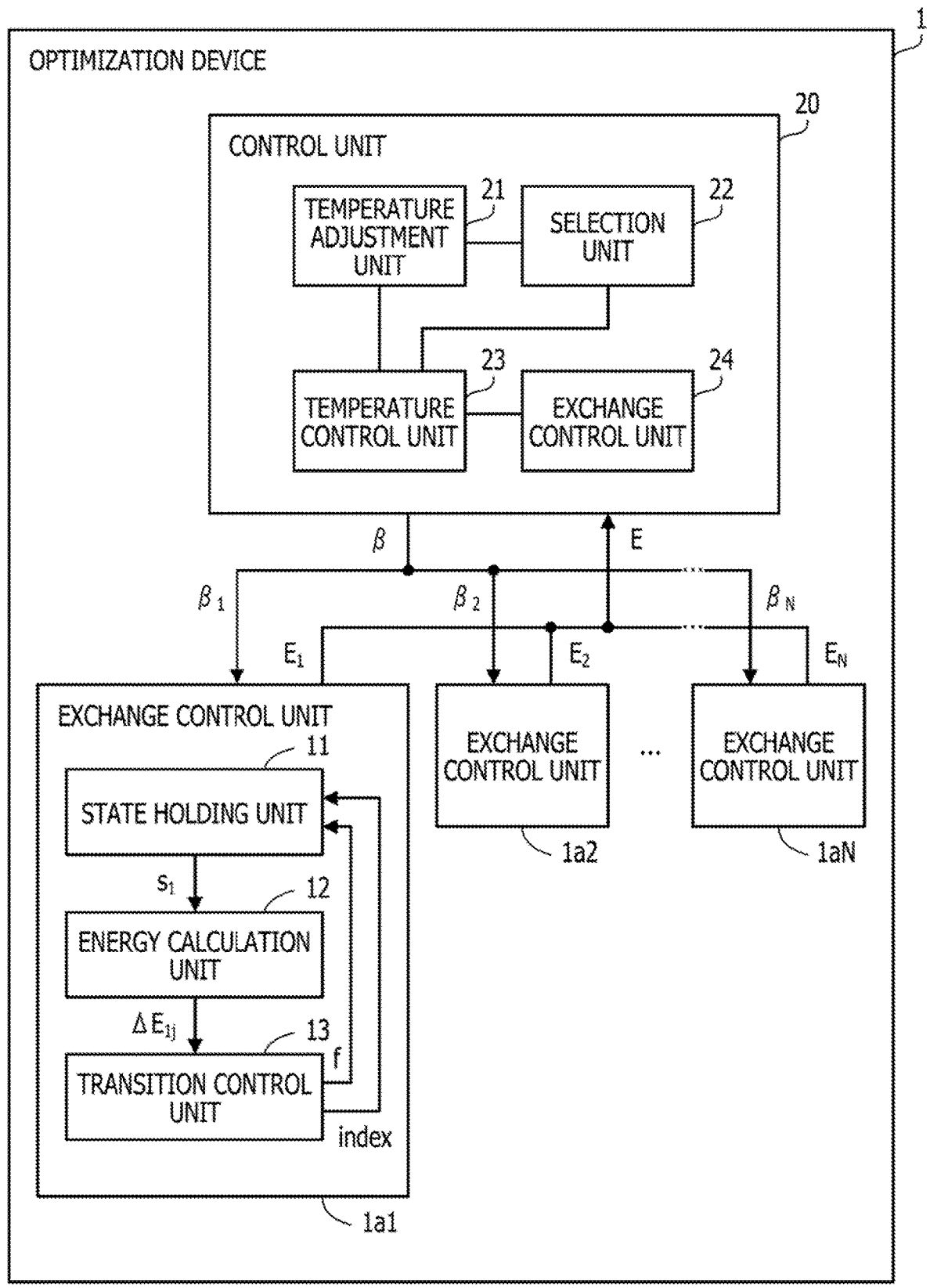
FIG. 1 is a diagram illustrating an optimization device according to a first embodiment.

FIG. 1 is a diagram illustrating an optimization device according to the first embodiment.

An optimization device 1 searches for values (ground state) of each state variable when an evaluation function has a minimum value, among combinations (states) of respective values of a plurality of state variables corresponding to a plurality of spins included in an Ising model obtained by converting an optimization problem of a calculation target. The optimization device 1 includes a plurality of search units corresponding to the Ising model, and uses the replica exchange method to search for the ground state. Here, the evaluation function may be referred to as a cost function, an objective function, an energy function, or the like. In addition, the state variable may be referred to as a bit, a spin bit, or the like.

An Ising-type evaluation function $E(x)$ is defined by the following Expression (1), for example.

[Math. 1]

$$E(x) = -\sum_{(i,j)} W_{ij} x_i x_j - \sum_i b_i x_i \qquad (1)$$

The first term on the right side adds up the products of two state variable values (0 or 1) and coupling coefficients without missing and overlapping among all combinations of two state variables selectable from all state variables included in the Ising model. The total number of state variables included in the Ising model is set to be n (n is an integer of 2 or more). In one example, n=1024 or n=8192. In addition, each of i and j is an integer of 1 or more and n−1 or less. $x_i$ is an i-th state variable. $x_j$ is a j-th state variable. $W_{ij}$ is a weighting coefficient indicating the magnitude of interaction between the i-th and j-th state variables. $W_{ii}=0$. In addition, in many cases, $W_{ij}=W_{ji}$. That is, a coefficient matrix based on weighting coefficients may be a symmetric matrix having diagonal elements of 0 in many cases.

A second term on the right side is a sum of a product of values of a bias coefficient and a state variable, for each of all state variables. $b_i$ indicates the bias coefficient of the i-th state variable, In addition, when the value of a state variable $x_i$ changes to $1-x_i$, an increase amount of the state variable $x_i$ is represented by $\delta x_i = (1-x_i)-x_i = 1-2x_i$. Thus, an energy change $\Delta E_i$ in response to spin reversal (the change in the value of the state variable) is represented by the following Expression (2).

[Math. 2]

$$\begin{aligned}\Delta E_i &= E(x)|_{x_i \to 1-x_i} - E(x) \\ &= -\delta x_i \left( \sum_j W_{ij} x_j + b_i \right) \\ &= -\delta x_i h_i \\ &= \begin{cases} -h_i & \text{for } x_i = 0 \to 1 \\ +h_i & \text{for } x_i = 1 \to 0 \end{cases}\end{aligned} \qquad (2)$$

$h_i$ is referred to as a local field and is represented by Expression (3).

[Math. 3]

$$h_i = \sum_j W_{ij} x_j + b_i \qquad (3)$$

The energy change $\Delta E_i$ is obtained by multiplying the local field $h_i$ by a sign (+1 or −1) in accordance with $\delta x_i$. A change amount $\delta h_i^{(j)}$ of the local field $h_i$ when a certain variable $x_j$ changes is represented by Expression (4).

[Math. 4]

$$\delta h_i^{(j)} = \begin{cases} +W_{ij} & \text{for } x_j = 0 \to 1 \\ -W_{ij} & \text{for } x_j = 1 \to 0 \end{cases} \qquad (4)$$

Each search unit holds the local field $h_i$ for the state variable $x_i$, and adds the change amount $\delta h_i^{(j)}$ to $h_i$ when the value of another state variable $x_j$ changes, thereby obtaining $h_i$ corresponding to the state after bit reversal. The optimization device 1 may obtain the energy change value $\Delta E_i$ when the state variable $x_i$ is set as the change candidate, from the local field $h_i$ based on Expression (2).

In each search unit, a process of updating the local field $h_i$ when the value of a certain state variable $x_j$ changes is performed, for example, in parallel for each state variable in the search unit.

In each search unit, the Metropolis method or the Gibbs method is used for determining whether or not to allow a change in the value of the state variable. That is, regarding neighbor search of searching for a transition from a certain state to another state of lower energy, each search unit stochastically allows a transition to not only a state where energy is lowered but also to a state where energy is increased. For example, a probability (transition acceptance probability) A that accepts a change in the value of the state variable of the energy change $\Delta E$ is represented by Expression (5).

[Math. 5]

$$A(\Delta E) = \begin{cases} \min[1, \exp(-\beta \cdot \Delta E)] & \text{Metropolis} \\ 1/[1 + \exp(\beta \cdot \Delta E)] & \text{Gibbs} \end{cases} \qquad (5)$$

Here, $\beta$ is the reciprocal (inverse temperature value) of the temperature value T, and $\beta=1/T$. A min operator indicates that a minimum value of an argument is taken. For example, in a case where the Metropolis method is used, each search unit allows a change in the value of the corresponding state variable when the energy change ΔE satisfies Expression (6) with respect to a uniform random number u (0<u≤1), in the following description, "log" represents a natural logarithm.

[Math. 6]

$$T \cdot \log(u) \leq -\Delta E \quad (6)$$

Each search unit transitions the state by changing the value of a state variable of which the change is allowed, and updating a local field of another state variable with a coupling coefficient between the state variables. The optimization device 1 sets a temperature belonging to a certain temperature range for each search unit and causes a state transition based on Expression (6) at each temperature, such that each search unit generates a state according to the Boltzmann distribution at the set temperature. Thus, the optimization device 1 performs the ground state search by repeatedly performing a process of stochastically exchanging the temperature or the state between the search units and causing the state transition in each search unit. For example, an exchange probability p represented by, for example, Expression (7) is used as the probability of exchanging the temperature or state between the i-th search unit and the j-th search unit.

[Math. 7]

$$p_{ij} = \exp\!\left((E_i - E_j)\!\left(\frac{1}{kT_i} - \frac{1}{kT_j}\right)\right) \quad (7)$$

Here, $E_i$ is the energy corresponding to the local solution of the i-th search unit. $E_j$ is the energy corresponding to the local solution of the j-th search unit. $T_i$ is the temperature of the i-th search unit. $T_j$ is the temperature of the j-th search unit. k is the Boltzmann constant.

The optimization device 1 includes a plurality of search units (search units 1a1, 1a2, . . . , and 1aN) and a control unit 20. N is an integer of 2 or more and corresponds to the number of search units. The optimization device 1 is realized by using, for example, a semiconductor integrated circuit such as a field-programmable gate array (FPGA).

Each of the search units 1a1 to 1aN includes a state holding unit, an energy calculation unit, and a transition control unit. For example, the search unit 1a1 includes a state holding unit 11, an energy calculation unit 12, and a transition control unit 13.

The state holding unit 11 holds values of a plurality of state variables included in an evaluation function representing energy value. Here, in FIG. 1, the energy value in the search unit 1a1 is represented by $E_1$, an inverse temperature is represented by $\beta_1$, and the values of the plurality of state variables in the search unit 1a1 are represented by $s_1$. Similarly, for the other search units, β and E are represented by adding subscripts to the numbers of the search units.

In a case where a state transition occurs by changing any of the values of the plurality of state variables, the energy calculation unit 12 calculates a change value ($\Delta E_{1j}$) of the energy value for each of a plurality of state transitions. j indicates an index of a state variable to be changed. In the search unit 1a1, $\Delta E_{1j}$ is calculated in parallel for each state variable.

The transition control unit 13 stochastically determines whether or not to accept any of the plurality of state transitions by a relative relation between the change value of the energy value and thermal excitation energy, based on a set temperature value and the change value, and a random number value. For example, as described above, the transition control unit 13 determines whether or not the state transition is possible, based on Expression (6), and outputs a flag f indicating whether or not the state transition is possible and the number of the state transition indicated by the flag f. In FIG. 1, the number of the state transition indicated by the flag f is represented by index.

The search units 1a1 to 1aN operate in parallel to perform the above-described ground state search.

The control unit 20 controls the search units 1a1 to 1aN. The control unit 20 includes a temperature adjustment unit 21, a selection unit 22, a temperature control unit 23, and an exchange control unit 24.

The temperature adjustment unit 21 determines a temperature value based on information obtained by the ground state search in the search units 1a1 to 1aN. The temperature adjustment unit 21 determines the temperature value (new temperature value) in a manner as follows. As will be described later, the new temperature value is used for dividing the search units 1a1 to 1aN into a plurality of groups. The new temperature value corresponds to the updated maximum temperature (update maximum temperature value) in a certain group, which is set in the search unit belonging to the group.

For example, the temperature adjustment unit 21 acquires temperature statistical information that is statistical information regarding the transition of the temperature value in each of the search units 1a1 to 1aN, and determines a new temperature value based on the acquired temperature statistical information. More specifically, in a case where the minimum value of the energy value is updated in any of the search units, the temperature adjustment unit 21 acquires, as the temperature statistical information, the highest temperature value among temperatures set in the corresponding search unit from the previous update to the current update of the minimum value of the energy value. Thus, the temperature adjustment unit 21 sets, as the new temperature value, a temperature value having the highest appearance frequency in a histogram obtained by counting the appearance frequency of the acquired temperature value for each temperature value.

Alternatively, the temperature adjustment unit 21 may acquire a plurality of local solutions obtained by the ground state search from each of the search units 1a1 to 1aN, and determine the new temperature value based on an energy increment generated when a state transition between the local solutions from a larger energy value to a smaller energy value is traced. More specifically, the temperature adjustment unit 21 may determine the new temperature value such that the state transition at the maximum value of the energy increment occurs at a predetermined probability.

The selection unit 22 divides the plurality of search units (search units 1a1 to 1aN) into a plurality of groups based on the temperature value determined by the temperature adjustment unit 21. For example, the selection unit 22 divides the search units 1a1 to 1aN into a first group and a second group. In the first group, temperature values belonging to a first temperature range from the minimum temperature value to the initial maximum temperature value are set. In the second group, temperature values belonging to a second temperature range from the minimum temperature value to a determined new temperature value (update maximum temperature value) are set. The selection unit 22 determines a temperature value to be set for each search unit belonging to the first group and a temperature value to be set for each search unit belonging to the second group.

The temperature adjustment unit 21 may determine a plurality of new temperature values, and the selection unit 22 may divide the search units 1a1 to 1aN into three or more groups including the first group based on the plurality of new temperature values.

The temperature control unit 23 sets the temperature value in the search unit belonging to each of the plurality of groups. For example, the temperature control unit 23 acquires information on the temperature value determined for the search unit of each group by the selection unit 22 and sets the temperature value in each of the search units 1a1 to 1aN.

The exchange control unit 24 exchanges the temperature values or the values of the plurality of state variables among search units belonging to the same group, after the ground state search for the energy value is performed a repetitive number of times or after a predetermined period has elapsed from the ground state search for the energy value. The exchange control unit 24 stochastically determines whether or not to exchange the temperature value or the state between the search units. As described above, the exchange control unit 24 uses the exchange probability p in Expression (7) to determine whether to perform the exchange. For example, the exchange control unit 24 stochastically exchanges the temperature value or the state between a pair of search units having set temperature values which are adjacent to each other, among the search units belonging to the same group. This is because the exchange probability decreases as a temperature difference increases.

Thus, the temperature adjustment unit 21 determines the update maximum temperature value based on a result of the ground state search performed by the search unit included in the first group.

The selection unit 22 determines the temperature value set in the search unit included in the second group, based on the determined update maximum temperature value.

FIG. 2 is a diagram illustrating an example of grouping search units.

The search units 1a1 to 1aN belong to one group G1 at the beginning of an optimization operation. A temperature value belonging to a temperature range from the minimum temperature value $T_{min}$ to the maximum temperature value $T_{max}$ is set in each of the search units 1a1 to 1aN belonging to the group G1. $T_{min}$ and $T_{max}$ are given to the optimization device 1 in advance. For example, at an initial stage, the temperature control unit 23 sets the temperature value determined by Expression (8) in each of the search units 1a1 to 1aN. The temperature control unit 23 may determine the temperature value.

[Math. 8]

$$T[i] = T_{min} \cdot \exp\left(\frac{i-1}{denom}\right) \quad (8)$$

T[i] indicates the temperature value set in the i-th search unit. denom is represented by, for example, Expression (9).

[Math. 9]

$$denom = \frac{N-1}{\log\left(\frac{T_{max}}{T_{min}}\right)} \quad (9)$$

The optimization device 1 performs the ground state search by a replica exchange method using the search units 1a1 to 1aN belonging to the group G1. For example, in a case where a state in the search unit having the minimum temperature does not change even after the state transition is performed a defined number of times, or in a case where the state in the search unit having the minimum temperature does not change for a defined period, the temperature adjustment unit 21 calculates the new temperature value by the above-described method based on the information obtained by the ground state search. For example, it is assumed that the temperature adjustment unit 21 determines the temperature value T[p] set in a search unit 1ap (1<p<N−1) among the search units 1a1 to 1aN, as the new temperature value $T_{max\_new}$ ($T_{max\_new}$=T[p]).

In this case, the selection unit 22 divides the group G1 into groups G2 and G3. The selection unit 22 determines the number of search units belonging to each of the groups G2 and G3, based on the original maximum temperature value $T_{max}$ and the new temperature value $T_{max\_new}$. In one example, the selection unit 22 determines the number $N_{Tmax}$ of search units belonging to the group G3 by Expression (10), and determines the number $N_{Tmax\_new}$ of search units belonging to the group G2 by Expression (11).

[Math. 10]

$$N_{Tmax} = N \cdot \frac{\log(T_{max})}{\log(T_{max}) + \log(T_{max\_new})} \quad (10)$$

[Math. 11]

$$N_{Tmax\_new} = N \cdot \frac{\log(T_{max\_new})}{\log(T_{max}) + \log(T_{max\_new})} \quad (11)$$

However, the selection unit 22 may determine $N_{Tmax\_new}$ such that $N_{Tmax\_new} \geq N_{Tmax}$. In addition, instead of substituting $T_{max}$ and $T_{max\_new}$ into Expression (10) and Expression (11) as they are, the selection unit 22 may substitute values corresponding to $T_{max}$ and $T_{max\_new}$ into Expression (10) and Expression (11). For example, the selection unit 22 may obtain the number of search units by substituting a value obtained by respectively multiplying $T_{max}$ and $T_{max\_new}$ by constants corresponding to the weights of $T_{max}$ and $T_{max\_new}$ into Expression (10) and Expression (11). Further, the selection unit 22 may determine $N_{Tmax}$ and $N_{Tmax\_new}$ such that $N_{Tmax}+N_{Tmax\_new}<N$.

For example, the selection unit 22 determines that $N_{Tmax\_new}$=q and $N_{Tmax}$=N−q (1<q<N−1). In this case, the selection unit 22 assigns the search units 1a1 to 1aq to the group G2, and assigns the search units 1a(q+1) to 1aN to the group G3.

Thus, for example, the selection unit 22 determines the temperature value to be set to each of the search units 1a1 to 1aq, from the temperature range from the minimum temperature value $T_{min}$ to the new maximum temperature value $T_{max\_new}$=T[p]. In addition, the selection unit 22 determines temperature values to be set in the search units 1a(q+1) to 1aN from the temperature range from the minimum temperature value $T_{min}$ to the original maximum temperature value $T_{max}$.

For example, the selection unit 22 may determine temperature values to be set in the search units in each group, among the temperature values set in the search units 1a1 to 1aN of the group G1. In this case, the selection unit 22 also acquires the state corresponding to the determined temperature value from the corresponding search unit, and sets the corresponding state (including the local field) along with the temperature value in the search unit in which this temperature value is set next.

When selecting the temperature value and the state to be handed over for the next search, the selection unit 22 may use the exchange probability of the temperature value or the state related to a pair of search units having adjacent temperature values. For example, the selection unit 22 may preferentially set each state in a pair of search units having a low exchange probability, as a handover target. Specifically, it is considered that, when creating the group G2, the selection unit 22 performs a process of sequentially excluding one in the pair of search units having the maximum exchange probability among p pieces of search units belonging to the search units 1a1 to 1ap, from the handover target one by one until the number of search units reaches q. Similarly, it is considered that, when creating the group G3, the selection unit 22 performs a process of sequentially excluding one in the pair of search units having the maximum exchange probability among N pieces of search units belonging to the search units 1a1 to 1aN, from the handover target one by one until the number of search units reaches (N−q). Both states in a pair of search units having a relatively high exchange probability tend to have energy values approximate to each other. Therefore, when a state which is obtained by thinning out one state in a pair having a relatively high exchange probability and then is handed over for the next search, or the state and a temperature value to be handed over for the next search are selected, the search unit in the group searches for the state corresponding to a relatively wide energy width, and the ground state search may be efficiently performed.

Alternatively, the selection unit 22 may determine the temperature value to be set to each search unit belonging to a certain group such that the temperature values from the minimum temperature value to the maximum temperature value in the group are equally spaced on a logarithmic axis (natural logarithmic axis). That is, the selection unit 22 may calculate a new temperature to be set in the search unit of each group using Expression (8) and Expression (9). In this case, it is considered that the selection unit 22 sets the state to be handed over for the next search, as the state of the search unit in which the temperature value closest to the determined temperature value is set, in the group G1.

The temperature control unit 23 acquires a temperature value and a state (including a local field corresponding to the state) to be set in each of the search units 1a1 to 1aq in the group G2 from the selection unit 22, and sets the temperature value and the state in each of the search units 1a1 to 1aq. In addition, the temperature control unit 23 acquires the temperature value and the state (including a local field corresponding to the state) to be set in each of the search units 1a(q+1) to 1aN in the group G3 from the selection unit 22, and sets the temperature value and the state in each of the search units 1a(q+1) to 1aN. Each search unit may obtain an energy value for a set state based on Expression (1), for example, by the sum of products of a plurality of state variables and local fields.

Thus, the ground state search by the replica exchange method continues independently in two systems of the groups G2 and G3. The temperature adjustment unit 21 recalculates the new temperature value $T_{max\_new}$ set in the group G2, based on the information obtained by the ground state search in the group G3. If the temperature adjustment unit 21 recalculates the new temperature value $T_{max\_new}$, the selection unit 22 updates the number of search units belonging to each of the groups G2 and G3 based on the updated new temperature value $T_{max\_new}$ and the maximum temperature value $T_{max}$, and updates the temperature value set in each of the search units of the groups G2 and G3.

As described above, the optimization device 1 divides the search units 1a1 to 1aN into a plurality of groups and performs the ground state search in each of the plurality of groups by the replica exchange method.

Accordingly, the replica exchange method is a method in which a plurality of replicas (search units) perform the ground state search at different temperatures and exchange, for example, temperatures or states (values of a plurality of state variables) in adjacent systems in accordance with an exchange probability determined from energy and the temperature in a certain cycle. According to the replica exchange method, even when a local solution when the temperature drops is obtained, it is possible to search for a global solution after the temperature rises to a high temperature by replica exchanger Thus, it is possible to obtain a solution quickly even though complicated temperature scheduling is not considered.

However, it is desirable to appropriately determine the temperature to be set in each replica, and when the maximum value of the temperature is too high or too low, the solution accuracy (that is, the possibility that the obtained solution is the optimum solution) may be lowered, or the search may take time. There is also a problem that the appropriate temperature range varies depending on the problem and is not known unless the problem is actually solved. In addition, it is also considered that the temperature range is determined from the results of the search in an initial predetermined period of the entire period in which the ground state search is performed, and then the ground state search is performed at the determined temperature. However; the temperature range determined in the predetermined period is not necessarily appropriate. In particular, in a case where the maximum temperature is determined to be a relatively low temperature, the possibility that reaching the lowest energy state is not possible increases.

Thus, as described above, the optimization device 1 divides the plurality of search units into the plurality of groups and causes each of the plurality of groups to perform the ground state search by the replica exchange method, thereby performing the search using the plurality of temperature ranges in parallel. Therefore in a certain group, it is possible to increase the possibility that a temperature range appropriate for a target problem is set, and to improve solution accuracy. In addition, it is possible to reduce the time to arrive at a solution. In this manner, it is possible to improve the solving performance.

In particular, the optimization device 1 may update the new temperature value $T_{max\_new}$ in the group G2, for example, by the ground state search in the original temperature range in the group G3. Therefore, even when the value of $T_{max\_new}$ previously determined is not appropriate, it is possible to correct the value of $T_{max\_new}$ to an appropriate value. Accordingly, in the group G2, it is possible to increase the possibility that the temperature range appropriate for the target problem is set, and to improve the solution accuracy. In addition, it is possible to reduce the time to arrive at a solution. In this mariner, it is possible to improve the solving performance.

Second Embodiment

Next, a second embodiment will be described.

Figure 3:
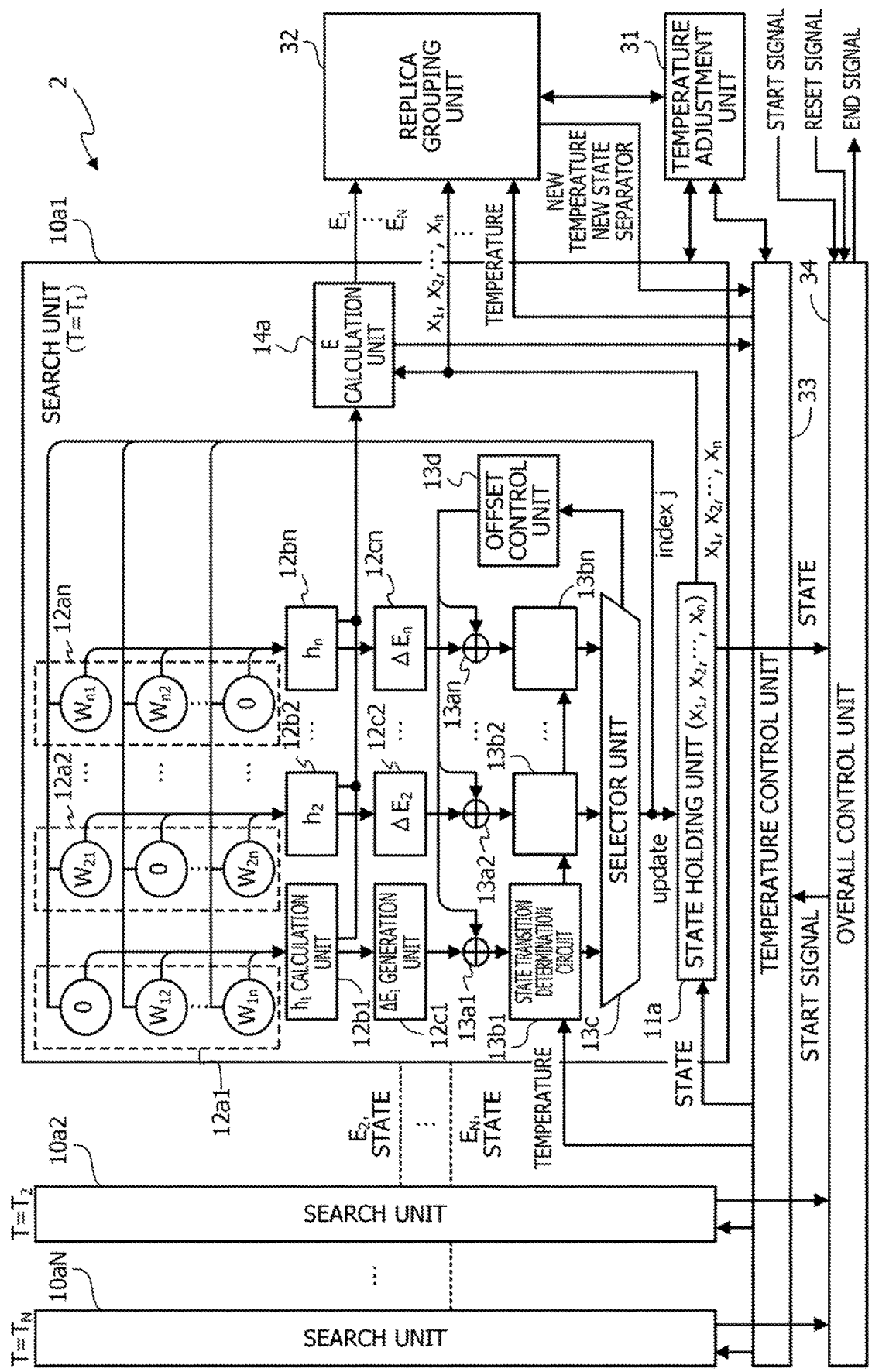
FIG. 3 is a diagram illustrating a circuit configuration example of an optimization device according to a second embodiment.

FIG. 3 is a diagram illustrating a circuit configuration example of an optimization device according to the second embodiment.

An optimization device 2 searches for values (ground state) of each spin bit when an evaluation function has a minimum value, among combinations (states) of respective values of a plurality of spin bits corresponding to a plurality of spins included in an Ising model obtained by converting an optimization problem of a calculation target. The optimization device 2 is realized by using, for example, a semiconductor integrated circuit such as an FPGA.

The optimization device 2 includes search units 10a1 to 10aN, a temperature adjustment unit 31, a replica grouping unit 32, a temperature control unit 33, and an overall control unit 34.

The search units 10a1 to 10aN correspond to the search units 1a1 to 1aN in the first embodiment. The temperature adjustment unit 31, the replica grouping unit 32, and the temperature control unit 33 correspond to the temperature adjustment unit 21, the selection unit 22, and the temperature control unit 23 in the first embodiment, respectively. Since the temperature control unit 33 includes the function of the exchange control unit 24, the exchange control unit is not illustrated in FIG. 3.

One search unit corresponds to one replica. Temperatures $T_1$ to $T_N$ different from each other are set in the search units 10a1 to 10aN. The initial temperatures $T_1$ to $T_N$ are determined, for example, based on Expression (8) and Expression (9) using the minimum temperature $T_{min}$ and the maximum temperature $T_{max}$ given in advance. Each of the search units 10a1 to 10aN realizes the ground state search based on the Ising-type evaluation function represented by Expression (1) by a circuit as follows. Description will be made below focusing on the search unit 10a1, and the search units 10a2 to 10aN have the similar circuit configuration.

The search unit 10a1 includes a state holding unit 11a, registers 12a1, 12a2, ..., and 12an, h calculation units 12b1, 12b2, ..., and 12bn, ΔE generation units 12c1, 12c2, ..., and 12cn, adders 13a1, 13a2, ..., and 13an, state transition determination circuits 13b1, 13b2, ..., and 13bn, a selector unit 13c, an offset control unit 13d, and an E calculation unit 14a.

The state holding unit 11a corresponds to the state holding unit 11 in the first embodiment. The h calculation units 12b1 to 12bn and the ΔE generation units 12c1 to 12cn correspond to the energy calculation unit 12 in the first embodiment. The adders 13a1 to 13an, the state transition determination circuits 13b1 to 13bn, the selector unit 13c, and the offset control unit 13d correspond to the transition control unit 13 in the first embodiment.

In FIG. 3, the h calculation units 12b1 to 12bn are named with a subscript i like "$h_i$" calculation unit such that it is easy to understand that the $h_i$ calculation unit correspond to the i-th spin bit. In addition, in FIG. 3, the ΔE generation units 12c1 to 12cn are named with a subscript i like a "$\Delta E_i$" calculation unit such that it is easy to understand that the $\Delta E_i$ generation unit correspond to the i-th spin bit.

The determination of which spin bit included in a spin bit string (state vector) is to be inverted and a process of inverting the spin bit in a case where the spin bit is to be inverted in a certain search unit correspond to one process in the ground state search (also referred to as stochastic search) by the search unit. The one process is repeated. The number of repetitions of the one process performed in parallel by the search units 10a1 to 10aN may be referred to as the number of iterations.

The number of spin bits in one search units is set to n. That is, a state vector has n bits. The register 12a1, the h calculation unit 12b1, the ΔE generation unit 12c1, the adder 13a1, and the state transition determination circuit 13b1 perform an operation on the first spin bit among n spin bits. In addition, the register 12a2, the h calculation unit 12b2, the ΔE generation unit 12c2, the adder 13a2, and the state transition determination circuit 13b2 perform an operation on the second spin bit among the n spin bits. Similarly, a numerical value i at the end of signs such as "12a1" and "12b1" indicates that an operation corresponding to the i-th spin bit is performed. That is, one search unit includes n sets (a set is one unit of an arithmetic operation process circuit that performs an arithmetic operation for one spin bit and may be referred to as "neuron", "neuron circuit", or the like) when the register, the h calculation unit, the ΔE generation unit, the adder, and the state transition determination circuit constitute one set. The n sets perform operations in parallel for the spin bits corresponding to the respective sets.

The register 12a1, the h calculation unit 12b1, the ΔE generation unit 12c1, the adder 13a1, and the state transition determination circuit 13b1 will be mainly described as an example. The registers 12a2 to 12an, the h calculation units 12b2 to 12bn, the ΔE generation units 12c2 to 12cn, the adders 13a2 to 13an, and the state transition determination circuits 13b2 to 13bn having the same configuration have the same function.

Here, a spin bit corresponding to the set of the register 12a1 the h calculation unit 12b1, the ΔE generation unit 12c1, the adder 13a1, and the state transition determination circuit 13b1 is referred to as the own spin bit, and the other spin bits calculated by the search unit 10a1 are referred to as the other spin bits. Each spin bit is identified by identification information referred to as index. For example, index of the i-th spin bit is i.

The state holding unit 11a holds a state in the search unit 10a1. The state is represented by a plurality of state variables (state variables $x_1, x_2, \ldots, x_n$). That is, the state is a spin bit string including n spin bits in the search unit 10a1.

The register 12a1 is a storage unit that stores weighting coefficients $W_{1j}$ (j=1 to n) between the own spin bit and the other spin bits. Here, the total number of weighting coefficients in the search unit 10a1 with respect to the number n of spin bits is $n^2$. The register 12a1 stores the n weighting coefficients. In addition, the subscript i of the weighting coefficient $W_{ij}$ indicates index of the own spin bit, and the subscript j of the weighting coefficient $W_{ij}$ indicates index of any spin bit including the own spin bit.

The register 12a1 stores n weighting coefficients $W_{11}$, $W_{12}, \ldots$, and $W_{1n}$ for the own spin bit. $W_{ii}=W_{11}=0$. The register 12a1 outputs the weighting coefficient $W_{1j}$ corresponding to index=j supplied from the selector unit 13c, to the h calculation unit 12b1.

The h calculation unit 12b1 calculates a local field $h_1$ based on Expression (3) and Expression (4) with the weighting coefficient $W_{1j}$ supplied from the register 12a1. For example, the h calculation unit 12b1 includes a register that holds the local field $h_1$ previously calculated, and updates $h_1$ stored in the register by integrating $h_1$ by $\delta h_1^{(j)}$ corresponding to an inversion direction of the spin bit indicated by index=j. A signal indicating the inversion direction of the spin bit indicated by index=j may be supplied from the selector unit 13c or the state holding unit 11a to the h calculation unit 12b1. The value of $h_1$ is set in advance in the register of the h calculation unit 12b1 in accordance with a problem. An initial value of $h_1$ is set in advance in the register of the h calculation unit 12b1 in accordance with the problem. In addition, the h calculation unit 12b1 outputs the calculated local field $h_1$ to the ΔE generation unit 12c1 and the E calculation unit 14a.

The ΔE generation unit 12c1 generates an energy change value $ΔE_1$ of the Ising model corresponding to the inversion of the own spin bit, based on Expression (2) using the local field $h_1$. For example, the ΔE generation unit 12c1 may determine the inversion direction of the own spin bit from the current value of the own spin bit supplied from the state holding unit 11a. When the current value is 0, the inversion direction is from 0 to 1, and when the current value is 1, the inversion direction is from 1 to 0. The ΔE generation unit 12c1 outputs the generated energy change value $ΔE_1$ to the adder 13a1. Here, the ΔE generation unit 12c1 may output the energy change value $-ΔE_1$ obtained by reversing the sign of the energy change value $ΔE_1$, to the adder 13a1 in accordance with an addition process in the adder 13a1 and a determination process in the state transition determination circuit 13b1 at the subsequent stage. In this example, the ΔE generation unit 12c1 outputs $-ΔE_1$ to the adder 13a1 as the energy change value.

The adder 13a1 adds $-ΔE_1$ supplied from the ΔE generation unit 12c1 and an offset value $E_{off}$ supplied from an offset control unit 13d. As will be described later, the offset value $E_{off}$ is a parameter for prompting a state transition, and is controlled by the offset control unit 13d. In this example, $E_{off} \geq 0$. The initial value of $E_{off}$ is 0. $E_{off}$ may be gradually increased by the offset control unit 13d described later. The adder 13a1 outputs the addition result $(-ΔE_1+E_{off})$ to the state transition determination circuit 13b1.

The state transition determination circuit 13b1 outputs a flag $f_1$ to the selector unit 13c response to the sum $(-ΔE_1+E_{off})$ of the energy change value and the offset value $E_{off}$ supplied from the adder 13a1. The flag $f_1$ indicates whether or not inversion of the own spin bit is possible. Specifically, the state transition determination circuit 13b1 determines whether or not inversion of the own spin bit is possible, in accordance with a comparison of $-ΔE_1+E_{off}$ with thermal noise or thermal excitation energy corresponding to the temperature.

Here, the determination by the state transition determination circuit 13b1 will be described.

In simulated annealing, an allowance probability A (ΔE) of a state transition that causes a certain energy change ΔE is determined as in the above-described Expression (5). In Expression (5), β=1/T is the inverse temperature. The temperature T is set in the state transition determination circuit 13b1 by the temperature control unit 33. In addition, a function based on the Metropolis method or a function based on the Gibbs method is used as the function f.

For example, a circuit that outputs a flag (flg=1) indicating that a state transition that causes the energy change ΔE is allowed at an allowance probability A (ΔE) may be realized by a comparator that outputs a value that corresponds to a comparison of f(−ΔE/T) with the uniform random number u that takes the value of a section [0, 1).

However, it is possible to realize the same function even though the modification as follows is made. Even though the same monotonically increasing function acts on two numbers, the magnitude relationship does not change. Thus, even though the same monotonically increasing function acts on two inputs of the comparator, the output of the comparator does not change. For example, it is possible to use an inverse function $f^{-1}(-ΔE/T)$ of f(−ΔE/T) as a monotonically increasing function that acts on f(−ΔE/T), and to use $f^{-1}(u)$ in which −ΔE/T of $f^{-1}(-ΔE/T)$ is set as u, as a monotonically increasing function that acts on a uniform random number u. In this case, a circuit having the same function as the above-described comparator may be a circuit that outputs 1 when −ΔE/T is greater than $f^{-1}(u)$. Further, since the temperature parameter T is positive, the state transition determination circuit 13b1 may be a circuit that outputs flg=1 when −ΔE is equal to or greater than $T \cdot f^{-1}(u)$ (or when ΔE is equal to or smaller than $-(T \cdot f^{-1}(u))$).

The state transition determination circuit 13b1 generates the uniform random number u, and outputs the value of $f^{-1}(u)$ by using a conversion table for converting the generated uniform random number u into the value of $f^{-1}(u)$. For example, in a case where the Metropolis method is applied, $f^{-1}(u)=\log(u)$, and the determination expression in the state transition determination circuit 13b1 is Expression (6).

The conversion table is stored in the register included in the state transition determination circuit 13b1. The state transition determination circuit 13b1 generates a product $(T \cdot f^{-1}(u))$ of the temperature parameter T and $f^{-1}(u)$, and compares the product with $(-ΔE_1+E_{off})$. Here, $T \cdot f^{-1}(u)$ corresponds to thermal noise (or thermal excitation energy). In a case where $(-ΔE_1+E_{off}) \geq T \cdot f^{-1}(u)$, the state transition determination circuit 13b1 outputs the flag $f_1=1$ (transition possible) to the selector unit 13c. In a case where $(-ΔE_1+E_{off}) < T \cdot f^{-1}(u)$, the state transition determination circuit 13b1 outputs the flag $f_1=0$ (transition not allowed) to the selector unit 13c.

The state transition determination circuit 13b1 may modify $(-ΔE_1+E_{off}) \geq T \cdot f^{-1}(u)$ and output a flag indicating whether or not the transition is possible in accordance with a comparison of an evaluation value obtained by adding a noise value $T \cdot f^{-1}(u)$, corresponding to the temperature to $(ΔE_1-E_{off})$ to a threshold value (for example, 0).

The selector unit 13c receives the flag indicating whether or not a transition is possible, which is output from each of the state transition determination circuits 13b1 to 13bn. In a case where the flags output from the state transition determination circuits 13b1 to 13bn include a flag indicating that transition is possible, the selector unit 13c selects any one flag indicating that transition is possible. In a case where the flags output from the state transition determination circuits 13b1 to 13bn do not include the flag indicating that transition is possible, the selector unit 13c selects one predetermined flag.

The selector unit 13c outputs, to the state holding unit 11a, an update signal (update) including the flag indicating whether or not a transition is possible and index=j indicating a spin bit corresponding to the selected flag. At the same time, the selector unit 13c outputs the selected flag indicating whether or not a transition is possible, to the offset control unit 13d, and outputs index=j corresponding to the selected flag to each of the registers 12a1 to 12an.

The offset control unit 13d controls the offset value to be supplied to each of the adders 13a1 to 13an based on the flag indicating whether or not a transition is possible, which is output from the selector unit 13c. Specifically, in a case where the flag output from the selector unit 13c indicates that the transition is possible, the offset control unit 13d resets the offset value to 0. In a case where the flag output from the selector unit 13c indicates that the transition is not possible, the offset control unit 13d adds an increment value $ΔE_{off}$ to the offset value. In a case where the flag continuously indicates that the transition is not possible, the offset control unit 13d integrates $ΔE_{off}$ to increase the $E_{off}$ by $ΔE_{off}$.

In a case where the flag output from the selector unit 13c indicates that the transition is not possible, it is considered that the current state falls into a local solution. The addition of the offset value to $-\Delta E_1$ or the gradual increase of the offset value to be added make it easier to permit the state transition, and in a case where the current state is in the local solution, the escape from the local solution is accelerated.

The state holding unit 11a updates the state $(x_1, x_2, \ldots, x_n)$ held by the register in the state holding unit 11a based on the flag and index output from the selector unit 13c. In a case where the flag indicates that the transition is possible, the state holding unit 11a inverts the value of the bit corresponding to index. For example, in a case where the flag indicates that the transition is possible, the state holding unit 11a does not invert the bit value. The state holding unit 11a outputs the current state to the E calculation unit 14a. The state holding unit 11a outputs the state when a search process in the search unit 10a1 is completed, to the overall control unit 34.

The E calculation unit 14a calculates the current energy value $E_1$ of the Ising model in the search unit 10a1, based on the local fields $h_1$ to $h_n$ output from the h calculation units 12b1 to 12bn and the states ($x_1$ to $x_n$) output from the state holding unit 11a. The energy value $E_1$ is an energy value also simply referred to as energy) defined by the evaluation function of Expression (1). The E calculation unit 14a calculates the energy value $E_1$ in the search unit 10a1 by the product-sum of the local field $h_i$ and the state $x_i$. When the search process in the search unit 10a1 is performed a predetermined number of times or the search process for a predetermined period in the search unit 10a1 is completed, the E calculation unit 14a outputs the calculated energy value $E_1$ to the temperature adjustment unit 31, the replica grouping unit 32, and the temperature control unit 33.

The temperature adjustment unit 31 obtains a new temperature value (update maximum temperature value) $T_{max\_new}$, based on the result of the ground state search performed a predetermined number of times by the search units 10a1 to 10aN. That is, the temperature adjustment unit 31 receives energy values $E_1$ to $E_N$ output from the search units 10a1 to 10aN, respectively. In addition the temperature adjustment unit 31 acquires information on the temperature set in each of the search units 10a1 to 10aN from the temperature control unit 33. FIG. 3 illustrates an example in which a temperature $T_1$ is set in the search unit 10a1, a temperature $T_2$ is set in the search unit 10a2, . . . , and a temperature $T_N$ is set in the search unit 10aN. In one example, the temperature adjustment unit 31 determines the new temperature value $T_{max\_new}$ in accordance with the change in the energy values $E_1$ to $E_N$ and the change in the temperatures set in the search units 10a1 to 10aN. The temperature adjustment unit 31 outputs the determined new temperature value $T_{max\_new}$ to the temperature control unit 33. The temperature adjustment unit 31 may output the determined new temperature value $T_{max\_new}$ to the replica grouping unit 32.

The replica grouping unit 32 receives the energy values $E_1$ to $E_N$ output from the search units 10a1 to 10aN and the states corresponding to the energy values. In addition, the replica grouping unit 32 receives the temperature value set in each of the search units 10a1 to 10aN. Further, the replica grouping unit 32 acquires the new temperature value $T_{max\_new}$ determined by the temperature adjustment unit 31 through the temperature control unit 33 or from the temperature adjustment unit 31. The replica grouping unit 32 divides the search units 10a1 to 10aN into a plurality of groups based on the energy value, the state, the temperature value, and the new temperature value $T_{max\_new}$ of each of the search units 10a1 to 10aN. In the second embodiment, a case where the search units 10a1 to 10aN are divided into two groups will be described, but the search units may be divided into three or more groups.

The replica grouping unit 32 supplies, to the temperature control unit 33, information (separator) indicating the search units belonging to each group, information of new temperatures to be set in the search units belonging to each group, and information of new states to be set in the search units belonging to each group. The separator is the number (the number of the search unit located at the boundary of the group) of the search unit that divides the group. For example, when the search units are divided into two groups, a search unit group belonging to a number range before the number designated by the separator is a first group, and a search unit group belonging to a number range after the number designated by the separator is a second group. The new state set in the search unit belonging to each group also includes information of the local field corresponding to the new state.

The temperature control unit 33 controls the temperature supplied to each of the search units 10a1 to 10aN. The temperature control unit 33 supplies temperature information indicating the temperature to the state transition determination circuit included in each of the search units 10a1 to 10aN. For example, the temperature control unit 33 specifies to which group each of the search units 10a1 to 10aN belongs, based on the separator supplied from the replica grouping unit 32. The temperature control unit 33 sets a temperature value belonging to an individual temperature range for the search unit of each group.

In addition, the temperature control unit 33 controls exchange of the temperature (temperature exchange) in the search units 10a1 to 10aN. The temperature control unit 33 determines whether or not to perform temperature exchange or state exchange for each pair of search units (a set of two search units) having adjacent temperatures, based on the exchange probability in Expression (7). The temperature control unit 33 supplies the temperature or state after the exchange to each search unit. In a case where the state is exchanged instead of the temperature, the temperature control unit 33 exchanges the local field in addition to the state.

For example, the temperature control unit 33 holds first correspondence information in which temperature identification information (referred to as a temperature index or a temperature number) is associated with a temperature, in a register included in the temperature control unit 33. For example, the temperature index is associated with the temperature in ascending order of temperature (the temperature is higher as the temperature index is higher). Further, the temperature control unit 33 holds second correspondence information in which, for example, temperature indices arranged in ascending order are associated with the identification numbers of the search units 10a1 to 10aN, in a register included in the temperature control unit 33. In this case, the pair of search units corresponding to the temperature indices adjacent to each other in the second correspondence information have the set temperatures adjacent to each other. The temperature control unit 33 controls temperature exchange for the search units 10a1 to 10aN based on the first correspondence information and the second correspondence information, and updates the second correspondence information in response to the exchange. The temperature control unit 33 supplies the temperature to each search unit based on the first correspondence information and the second correspondence information.

However, the temperature control unit 33 may hold correspondence information in which the identification number of each of the search units 10a1 to 10aN is associated with the temperature value, and sort the correspondence information by the temperature value, thereby specifying a pair of search units having adjacent set temperatures.

In addition, in a case where the search units 10a1 to 10aN are divided into a plurality of groups, the temperature control unit 33 holds the first correspondence information and the second correspondence information for each group, thereby independently controlling replica exchange in pairs of search units belonging to the same group for each group.

The overall control unit 34 controls the overall operation of the optimization device 2. When receiving an input of a start signal from the outside, the overall control unit 34 outputs the start signal to the temperature control unit 33, starts the search units 10a1 to 10aN, and starts the operation of the ground state search for an optimization problem. When the operation is ended, the overall control unit 34 acquires the state from each of the search units 10a1 to 10aN and obtains a solution to the optimization problem. For example, the overall control unit 34 sets a state corresponding to the lowest energy among the acquired states, as a solution. The overall control unit 34 outputs an end signal indicating the end of the operation to the outside. The end signal may include information indicating the solution obtained by the operation. For example, the overall control unit 34 may output image information indicating the solution to a display device coupled to the optimization device 2, and display the image information indicating the solution on the display device to present the contents of the obtained solution to a user.

In addition, when receiving a reset signal from the outside, the overall control unit 34 clears information held by the search units 10a1 to 10aN, the temperature adjustment unit 31, the replica grouping unit 32, and the temperature control unit 33.

Next, an example of determining the new temperature value (update maximum temperature value) by the temperature adjustment unit 31 will be described. However, the method described below is an example, and the temperature adjustment unit 31 may determine the new temperature value by another method as described later.

For example, the temperature adjustment unit 31 acquires temperature statistical information being statistical information on the transition of the temperature value in each of the search units 10a1 to 10aN, and determines the update maximum temperature value to be set in the search unit belonging to each of the plurality of groups, based on the acquired temperature statistical information.

FIG. 4 is a diagram illustrating an example of changing the lowest energy.

A graph 50 depicts an example of a history of changes in the lowest energy in a certain search unit for a predetermined period. A graph 60 depicts an example of changes in the temperature in the search unit.

A horizontal axis of the graphs 50 and 60 is time, and a direction from the left side to the right side is a positive direction of time. The same position on the horizontal axis of the graphs 50 and 60 indicates the same time. A vertical axis of the graph 50 is energy. A vertical axis of graph 60 is temperature. Temperatures Ta, Tb, Tc, and Td are indicated on the vertical axis of the graph 60. Here, Ta>Tb>Tc>Td.

The graph 50 includes a sequence 51. According to the sequence 51, the lowest energy is updated in two time section of time section 52 and 53.

The graph 60 includes a sequence 61. According to the sequence 61, the maximum temperature (maximum reached temperature) reached by the search unit between a time point at which the lowest energy is updated in the time section 52 and a time point at which the lowest energy is updated in the time section 53 is Ta.

In the example of the graphs 50 and 60, it is provided that, in order to update the lowest energy in the search unit, it is desired to increase the temperature to the maximum temperature Ta once. Thus, in order to update the lowest energy in a certain period, the temperature adjustment unit 31 acquires the maximum temperature reached in each search unit as temperature statistical information, and determines the temperature to be set in each search unit based on the temperature statistical information.

Figure 5A:
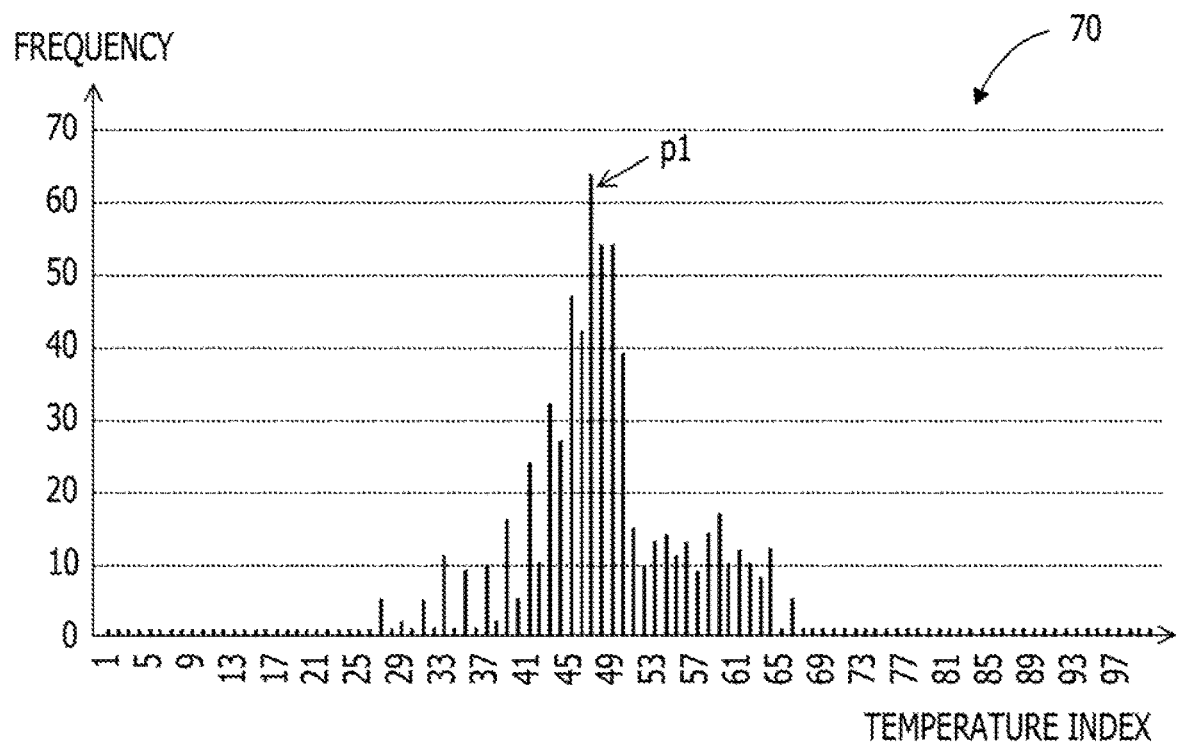
FIGS. 5A and 5B are a diagram illustrating examples of a temperature histogram and a cumulative histogram.
Figure 5B:
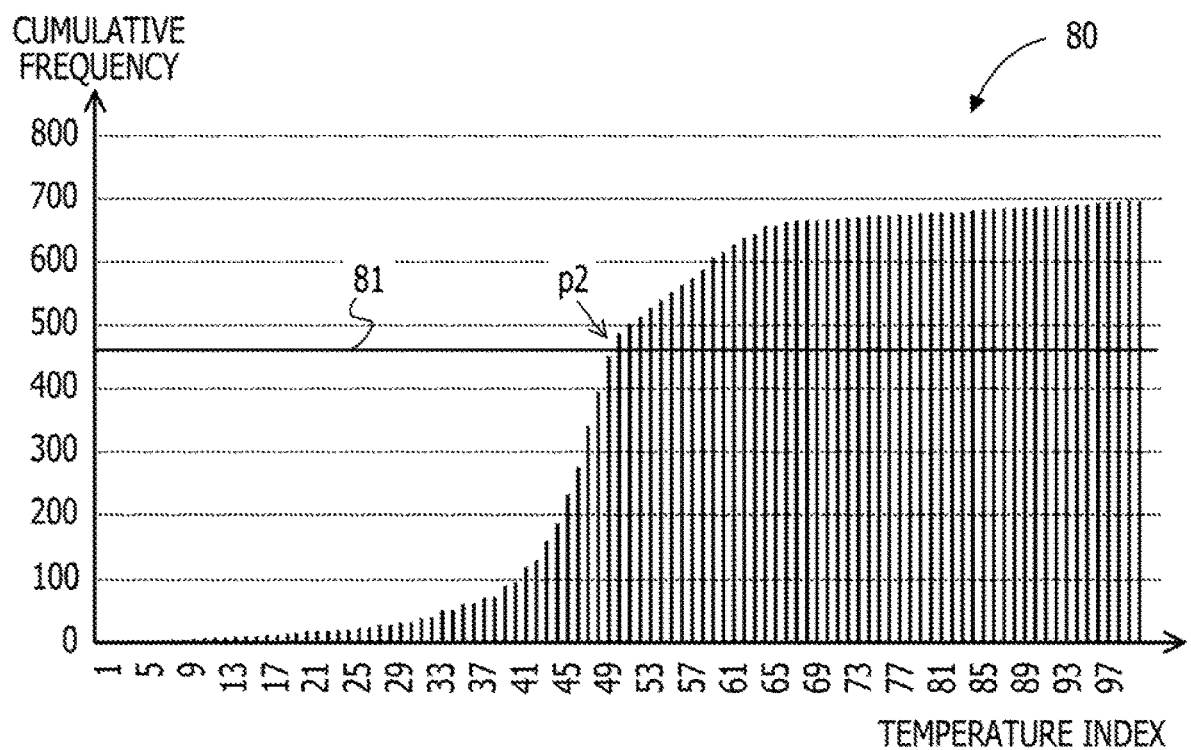

FIGS. 5A and 5B is a diagram illustrating examples of a temperature histogram and a cumulative histogram.

FIG. 5A illustrates a temperature histogram 70. The temperature histogram 70 is generated by the temperature adjustment unit 31 based on the temperature statistical information. The temperature histogram 70 indicates the frequency of the maximum temperature reached by each search unit in a group in which the temperature values belonging to a temperature range from the minimum temperature value $T_{min}$ to the maximum temperature value $T_{max}$ are set, in order to update the lowest energy. A horizontal axis of the temperature histogram 70 indicates a temperature index, and a vertical axis indicates the frequency.

For example, the temperature adjustment unit 31 determines the temperature value corresponding to the temperature index of the maximum frequency in the temperature histogram 70, as the maximum temperature value $T_{max}$. Specifically, the temperature adjustment unit 31 determines the new temperature value $T_{max\_new}$ from the temperatures having high frequencies in the temperature histogram 70. In one example, the temperature adjustment unit 31 determines the temperature value of the maximum frequency indicated by a peak p1, as the new temperature value $T_{max\_new}$. In a case where the temperature histogram 70 is created with respect to the temperature index, the temperature adjustment unit 31 specifies the temperature value corresponding to the temperature index, for example, by referring to the above-described first correspondence information. In this case, for example, it is considered that the above-described first correspondence information held by the temperature control unit 33 may be referred to by the temperature adjustment unit 31.

However, depending on the problem, the peak p1 as described above may not appear or a plurality of peaks may appear. In such a case, for example, the temperature adjustment unit 31 determines the new temperature value $T_{max\_new}$ using a cumulative histogram based on the temperature histogram 70, as follows.

FIG. 5B illustrates an example of a cumulative histogram 80.

The cumulative histogram 80 is a histogram obtained by accumulating the frequencies indicated by the temperature histogram 70 in ascending order of temperature. The cumulative histogram 80 is generated by the temperature adjustment unit 31. A horizontal axis of the cumulative histogram 80 indicates the temperature index, and a vertical axis indicates the cumulative frequency.

The temperature adjustment unit 31 determines the new temperature value $T_{max\_new}$ based on a ratio (cumulative ratio) $\alpha$ of the cumulative histogram. For example, the cumulative ratio a is set to 70% ($\alpha=0.7$) as an example. The cumulative histogram 80 depicts a straight line 81 indicating the cumulative ratio $\alpha=70\%$. In this case, the temperature adjustment unit 31 specifies a temperature value (temperature value corresponding to the cumulative frequency at a point p2) corresponding to the cumulative frequency obtained by multiplying the maximum value of the cumulative frequency in the cumulative histogram 80 by the coefficient $\alpha$ indicating the cumulative ratio, and determines the specified temperature value as the new temperature value $T_{max\_new}$. In this example, the maximum value of the cumulative frequency is a cumulative frequency corresponding to the maximum value of the temperature index. The coefficient $\alpha$ used as the cumulative ratio may be input from the outside.

As described above, the temperature adjustment unit 31 may determine the new temperature value $T_{max\_new}$ based on the temperature histogram 70 or the cumulative histogram 80 which is information obtained by the ground state search.

Next, an example of grouping the search units (replicas) by the replica grouping unit 32 based on the new temperature value $T_{max\_new}$ determined by the temperature adjustment unit 31 will be described.

Figure 6:
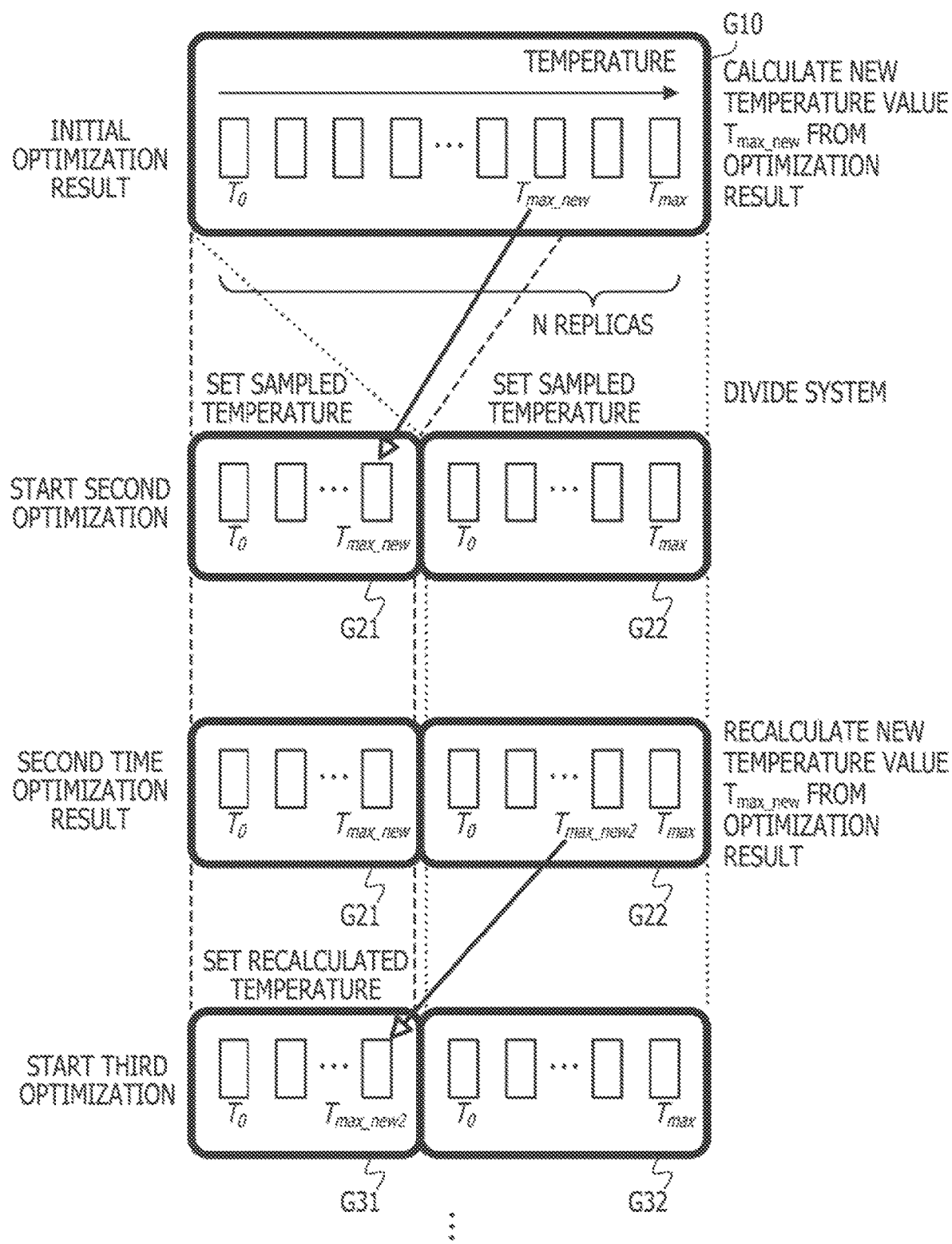
FIG. 6 is a diagram illustrating an example of grouping replicas in response to an update of the maximum temperature.

FIG. 6 is a diagram illustrating an example of grouping replicas in response to the update of the maximum temperature.

At an initial stage of an operation start, the search units 10a1 to 10aN belong to one group G10. That is, N replicas belong to the group G10. In FIG. 6, one rectangle in a frame of the group G10 indicates one search unit (replica). At an initial stage, the minimum temperature value is $T_0$ and the maximum temperature value is $T_{max}$. In addition, a solution to a certain optimization problem includes a plurality of optimization operations such as a first time, a second time, a third time, . . . , described below.

The optimization device 2 performs the first optimization operation using the replica exchange method, by the search units 10a1 to 10aN belonging to the group G10.

The temperature adjustment unit 31 calculates the new temperature value $T_{max\_new}$ from the result of the first optimization operation. For example, the temperature adjustment unit 31 determines a temperature value set in a certain search unit, as the new temperature value $T_{max\_new}$.

The replica grouping unit 32 divides the search units 10a1 to 10aN belonging to the group G10 into two systems of groups G21 and G22 based on the new temperature value $T_{max\_new}$. A temperature value belonging to a temperature range from the minimum temperature value $T_0$ to the maximum temperature value $T_{max\_new}$ is set in each search unit of the group G21. A temperature value belonging to a temperature range from the minimum temperature value $T_0$ to the maximum temperature value $T_{max}$ is set in each search unit of the group G22. The number of search units belonging to the group G21 is $N_{Tmax\_new}$. The number of search units belonging to the group G22 is $N-N_{Tmax\_new}$.

The optimization device 2 performs the second optimization operation using the replica exchange method, in each of the two systems of the groups G21 and G22.

Thus, the temperature adjustment unit 31 recalculates the new temperature value $T_{max\_new}$ from the result of the second optimization operation. The temperature adjustment unit 31 determines a temperature value set in a certain search unit belonging to the group G22, as the new temperature value $T_{max\_new}=T_{max\_new2}$.

The replica grouping unit 32 updates the number of search units belonging to the groups G21 and G22 and the set temperature, based on the new temperature value $T_{max\_new2}$. A group after the group G21 is updated is referred to as a group G31. A group after the group G22 is updated is referred to as a group G32. A temperature value belonging to a temperature range from the minimum temperature value $T_0$ to the maximum temperature value $T_{max\_new2}$ is set in each search unit of the group G31. A temperature value belonging to a temperature range from the minimum temperature value $T_0$ to the maximum temperature value $T_{max}$ is set in each search unit of the group G32. The number of search units belonging to the group G31 is $N_{Tmax\_new2}$. The number of search units belonging to the group G32 is $N-N_{Tmax\_new2}$.

The optimization device 2 performs the third optimization operation using the replica exchange method in each of the two systems of the groups G31 and G32.

Thereafter, in the similar manner, the replica grouping unit 32 updates the temperature range and the number of search units (the number of replicas) in each group, and the optimization operation is repeated.

Next, an example of a circuit configuration of the replica grouping unit 32 that performs the above-described processing will be described.

Figure 7:
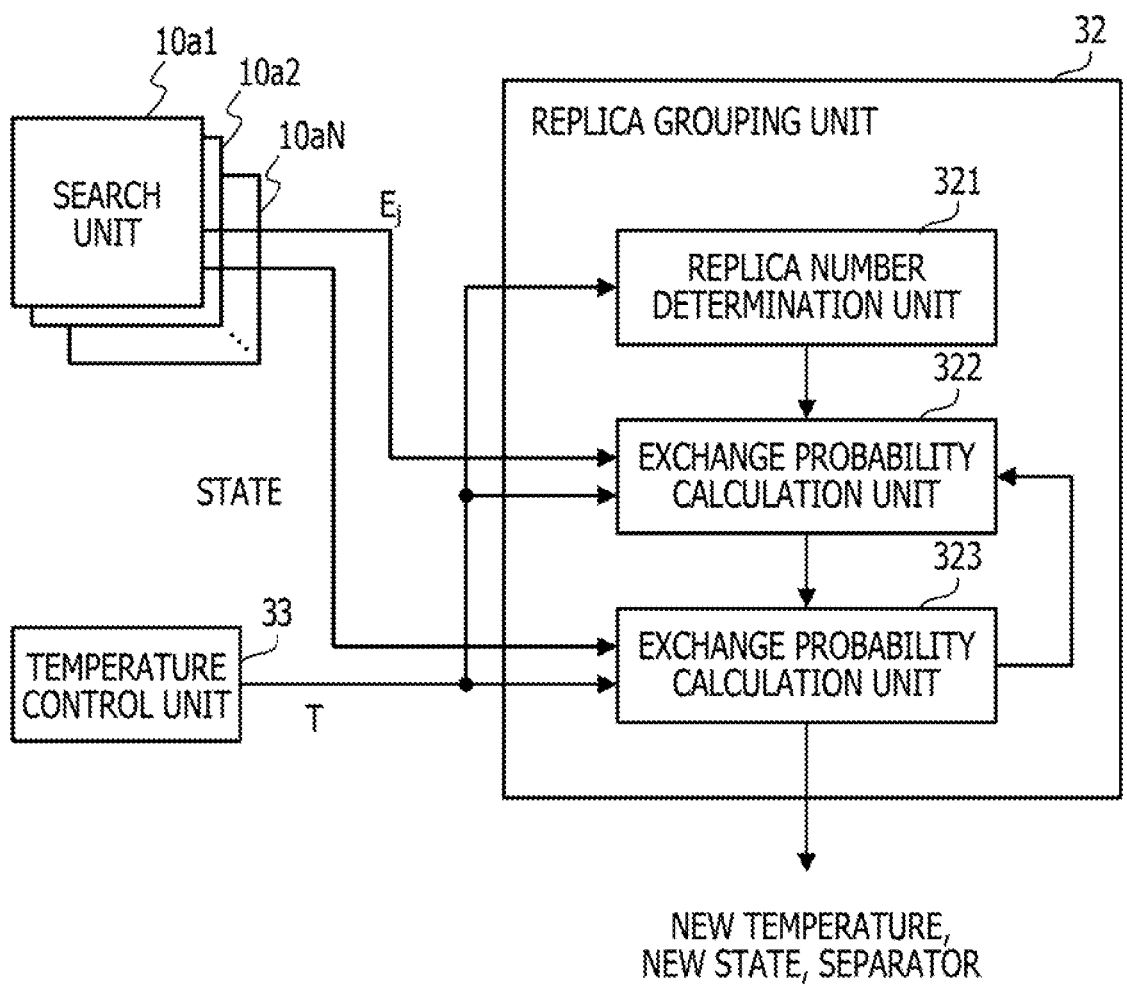
FIG. 7 is a diagram illustrating a circuit configuration example of a replica grouping unit.

FIG. 7 is a diagram illustrating a circuit configuration example of the replica grouping unit.

The replica grouping unit 32 includes a replica number determination unit 321, an exchange probability calculation unit 322, and a replica deletion unit 323.

The replica number determination unit 321 determines the number of search units belonging to each group (the number of replicas in each group) by Expression (10) and Expression (11) based on the initial maximum temperature value $T_{max}$ and the new temperature value $T_{max\_new}$, and supplies the determined number of search units to the exchange probability calculation unit 322.

The exchange probability calculation unit 322 calculates an exchange probability in a pair of search units of which temperature values are adjacent to each other by Expression (7), based on the energy value and state information supplied from the search units 10a1 to 10aN, and supplies the calculated exchange probability to the replica deletion unit 323 along with the number of replicas in each group.

The replica deletion unit 323 selects a replica (the temperature and state in the replica) to be handed over to the next search in each group, based on the exchange probability calculated by the exchange probability calculation unit 322.

As described above, the replica grouping unit 32 includes a calculation unit (exchange probability calculation unit 322) that calculates the exchange probability of exchanging the temperature value or the state (corresponding to the values of the plurality of state variables) between the plurality of search units, based on the energy values and the temperature values in the respective search units 10a1 to 10aN. The replica grouping unit 32 (or the replica deletion unit 323) selects a temperature value and values of a plurality of state variables to be handed over to each of the search units belonging to each of the plurality of groups among the temperature values and the values of the plurality of state variables in each of the search units 10a1 to 10aN. The selection is performed based on the temperature value determined by the temperature adjustment unit 31 and the exchange probability calculated by the exchange probability calculation unit 322.

Next, an example of selecting a replica by the replica grouping unit 32 will be described.

Figure 8:
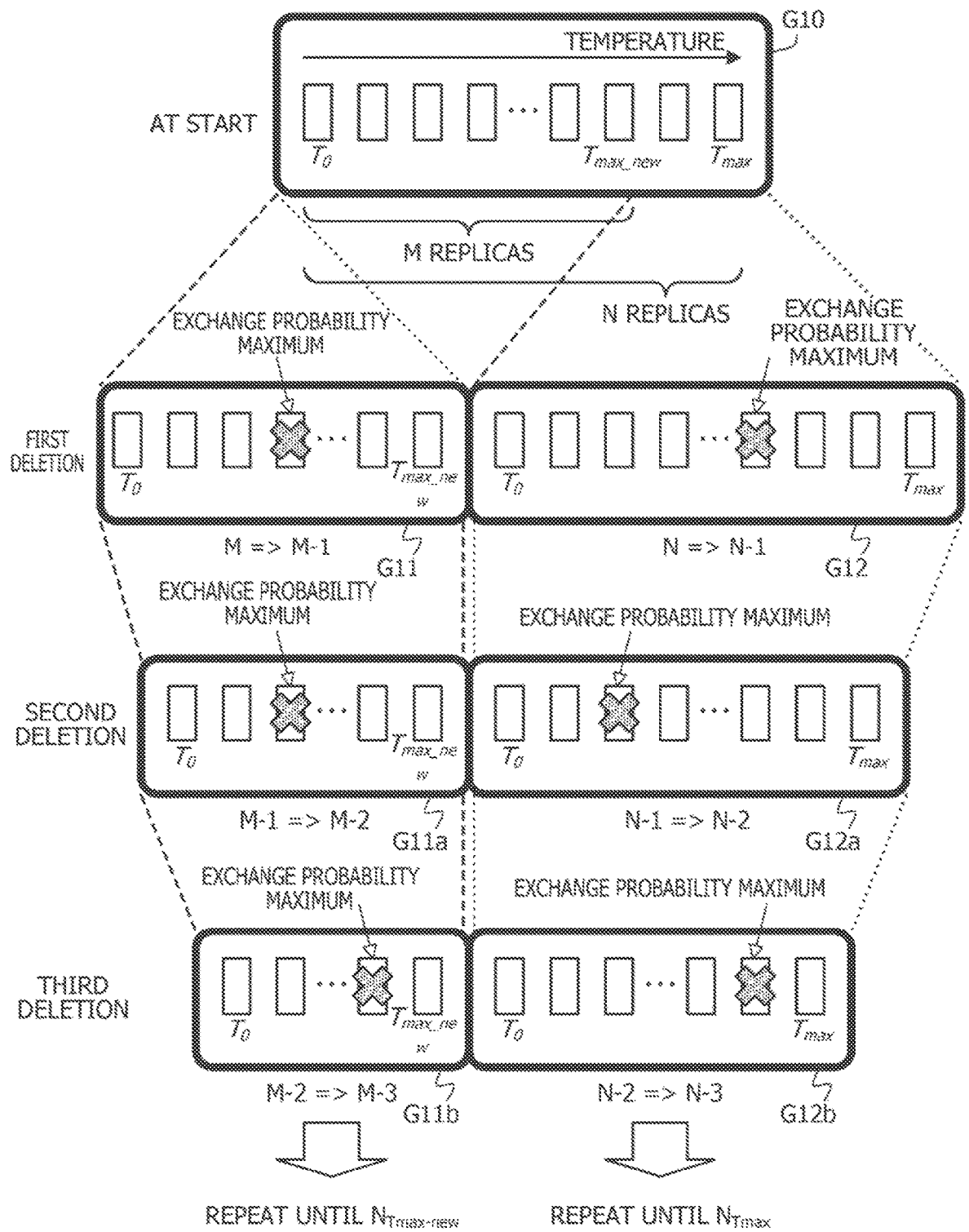
FIG. 8 is a diagram illustrating an example of selecting replicas to be assigned to each group.

FIG. 8 is a diagram illustrating an example of selecting a replica to be assigned to each group.

When the optimization device 2 starts the optimization operation, the search units 10a1 to 10aN belong to the group G10. The minimum temperature value in the group G10 is $T_0$. The maximum temperature value in group G10 is $T_{max}$.

The temperature adjustment unit 31 determines the new temperature value $T_{max\_new}$ from the result of the first optimization operation. The number of replicas in which a temperature value belonging to a temperature range from the minimum temperature value $T_0$ to the new temperature value $T_{max\_new}$ in the group G10 are set is M. In addition, the number of replicas in which a temperature value belonging to a temperature range from the minimum temperature value $T_0$ to the maximum temperature value $T_{max}$ in the group G10 are set is N.

The replica number determination unit 321 determines the number of replicas belonging to each of two groups in the next optimization operation, by Expression (10) and Expression (11) based on the maximum temperature value $T_{max}$ and the new temperature value $T_{max\_new}$. The replica number determination unit 321 determines the number of replicas of the group in which the temperature value up to the new temperature value $T_{max\_new}$ is set, as $N_{Tmax\_new}$. The replica number determination unit 321 determines the number of replicas of the group in which the temperature value up to the maximum temperature value $T_{max}$ is set, as $N_{Tmax}$.

The exchange probability calculation unit 322 calculates the exchange probability using Expression (7) for each pair of replicas that belong to the group G10 and have adjacent set temperature values.

The replica deletion unit 323 selects a replica to be assigned to each group, based on the calculated exchange probability, as follows.

Firstly, the replica deletion unit 323 creates a temporary group G11 in which the number of replicas is M, and a temporary group G12 in which the number of replicas is N. Replicas in which temperature values from the minimum temperature value $T_0$ to the new temperature value $T_{max\_new}$ are set in the group G10 belong to the temporary group G11. Thus, the number of replicas in the temporary group G11 is M. Replicas in which temperature values from the minimum temperature value $T_0$ to the maximum temperature value $T_{max}$ are set in the group G10 belong to the temporary group G12. Thus, the number of replicas in the temporary group G12 is N.

The replica deletion unit 323 performs first deletion of a replica.

The replica deletion unit 323 specifies a pair having the maximum exchange probability (referred to as an exchange probability maximum pair) among pairs of replicas included in the temporary group G11. The replica deletion unit 323 refers to the exchange probability for other two pairs (referred to as adjacent pairs) to which each of 2 replicas in the specified exchange probability maximum pair belongs, and specifies one having a greater exchange probability among the two adjacent pairs. The replica deletion unit 323 deletes, from the temporary group G11, a replica belonging to both the exchange probability maximum pair and the specified adjacent pair. As a result, the temporary group G11 is updated to a temporary group G11a. The number of replicas in the temporary group G11a is M-1.

In addition, for the temporary group G12, the replica deletion unit 323 specifies the exchange probability maximum pair and two adjacent pairs among pairs of replicas included in the temporary group G12. The replica deletion unit 323 deletes, from the temporary group G12, a replica belonging to both the exchange probability maximum pair and the adjacent pair having a greater exchange probability. As a result, the temporary group G12 is updated to a temporary group G12a. The number of replicas of the temporary group G12a is N-1.

Then, the replica deletion unit 323 performs second deletion of a replica. In a manner similar to the first deletion, the replica deletion unit 323 selects one replica to be deleted from each of the temporary groups G11a and G12a and deletes the selected replica from the temporary groups G11a and G12a. As a result, the temporary group G11a is updated to a temporary group G11b. The number of replicas of the temporary group G11b is M-2. The temporary group G12a is updated to a temporary group G12b. The number of replicas of the temporary group G12a is N-2.

The replica deletion unit 323 repeats the process of sequentially deleting one replica from each of the temporary groups G11b and G12b in the third deletion and the subsequent in a similar manner. Thus, when the number of replicas in a group corresponding to the new temperature value $T_{max\_new}$ reaches $N_{Tmax\_new}$, the replica deletion unit 323 ends the repetition for the group. When the number of replicas in the group corresponding to the maximum temperature $T_{max}$ reaches $N_{Tmax}$, the replica deletion unit 323 ends the repetition for the group.

In this manner, the replicas that remain without being deleted in each temporary group are selected as replicas to be assigned to each group. In this case, the temperature value and the state corresponding to the selected replica are handed over to the search for the next optimization operation. The replica deletion unit 323 outputs the temperature value and the state corresponding to the replica selected for each group, to the temperature control unit 33.

Both states in a pair of search units having a relatively high exchange probability tend to have energy values approximate to each other. Therefore, when a state (and the temperature value) which is obtained by thinning out one state in a pair having a relatively high exchange probability and then is handed over for the next search is selected, the search unit in the group searches for the state corresponding to a relatively wide energy width, and the ground state search may be efficiently performed.

Next, a processing procedure of the optimization device 2 will be described.

Figure 9:
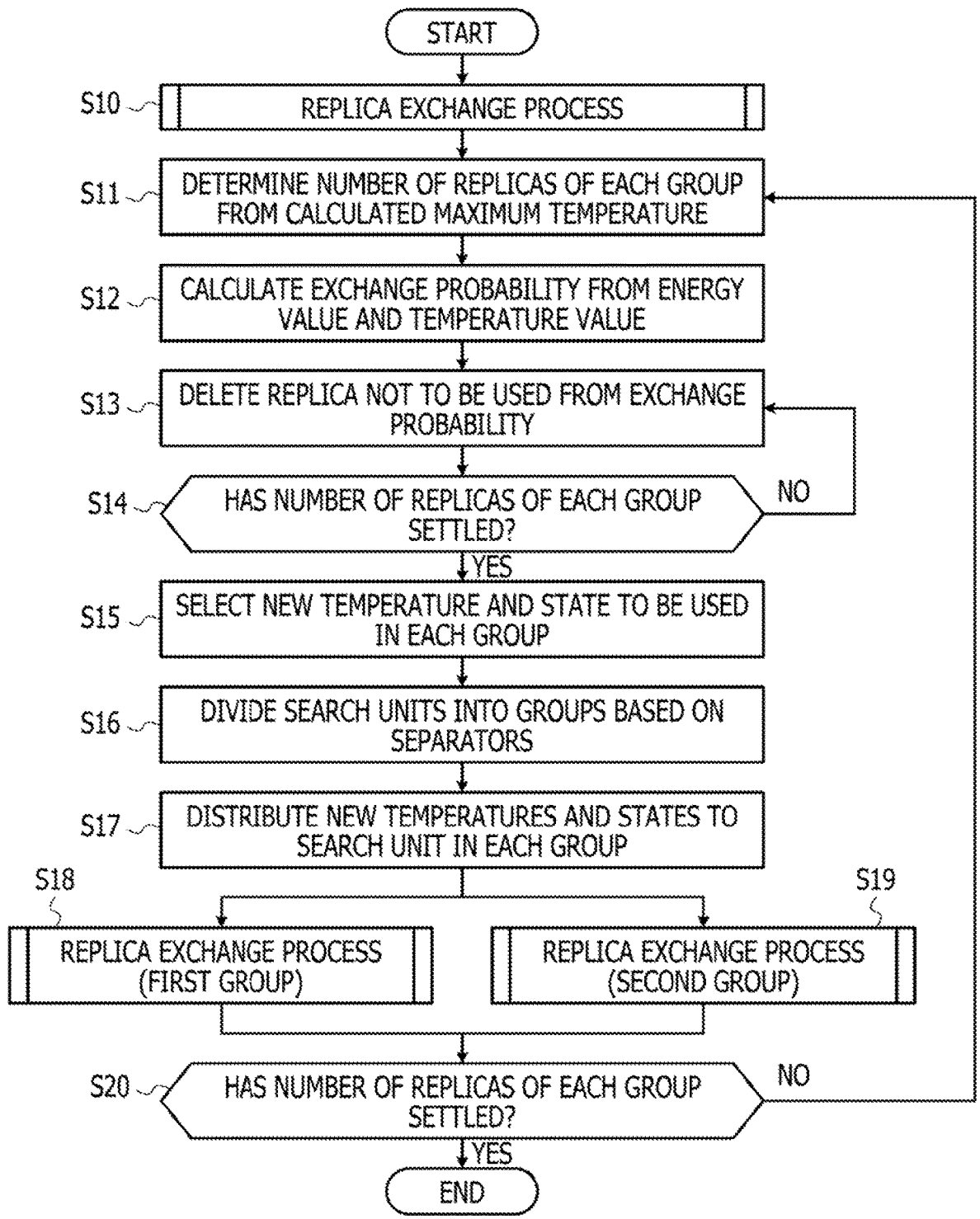
FIG. 9 is a flowchart illustrating a process example of the optimization device.

FIG. 9 is a flowchart illustrating a process example of the optimization device.

(S10) The overall control unit 34 causes the search units 10a1 to 10aN and the temperature control unit 33 to performs a replica exchange process. The search units 10a1 to 10aN and the temperature control unit 33 performs the first optimization operation using the replica exchange method under the control of the overall control unit 34. For example, initial values of various parameters input from the outside are set in the search units 10a1 to 10aN and the temperature control unit 33 through the overall control unit 34. Details of the replica exchange process will be described later.

(S11) The temperature adjustment unit 31 calculates the maximum temperature (new temperature value $T_{max\_new}$) based on the first optimization result. For example, the method illustrated in FIGS. 4 and 5 may be used as a calculation method. The replica number determination unit 321 determines the number of replicas in each group, from the calculated maximum temperature. For example, the replica number determination unit 321 may use Expression (10) and Expression (11) to determine the number of replicas. Here, the number of groups is set in advance in the optimization device 2. In this example, the number of groups is 2.

(S12) The exchange probability calculation unit 322 calculates an exchange probability for each pair of search units having adjacent temperature values, from the energy value acquired from each of the search units $10a1$ to $10aN$ and the temperature value set in each search unit. In a case where the search units $10a1$ to $10aN$ are divided into a plurality of groups, the exchange probability calculation unit 322 calculates the exchange probability for a pair of search units belonging to the same group, for each group.

(S13) The replica deletion unit 323 deletes one unused replica (corresponding to the search unit) from the temporary group illustrated in FIG. 8, based on the calculated exchange probability. For example, a group that is the source of the temporary group is a group in which the initial temperature range ($T_{min}$ to $T_{max}$) is set (in a case where Step S13 is performed for the second time or later, a group in which each temperature range is set may be used as the group that is the source of the temporary group).

(S14) The replica deletion unit 323 determines whether or not the number of replicas in each group falls to the number of replicas determined in Step S11. In a case where the number of replicas in all groups falls to the determined number of replicas, the process proceeds to Step S15. In a case where there is a group that does not fall to the determined number of replicas, the process proceeds to Step S13. In a case where the process proceeds to Step S13, the replica deletion unit 323 performs the process of Step S13 on the temporary group in which the number of replicas does not fall to the determined number of replicas.

(S15) The replica deletion unit 323 selects a temperature and a state to be used in each group. Specifically, the replica deletion unit 323 selects a temperature and a state corresponding to the replica selected (remaining without being deleted) for each group by the procedure of Steps S13 and S14, as the new temperature and the state to be set for each replica belonging to the corresponding group. The replica deletion unit 323 outputs a separator for dividing the search units $10a1$ to $10aN$ into a plurality of groups to the temperature control unit 33, and outputs the new temperature value and the state (including a local field) set in each search unit to the temperature control unit 33 for each group.

(S16) The temperature control unit 33 divides the search units $10a1$ to $10aN$ into a plurality of groups based on the separator supplied from the replica deletion unit 323. Here, the search units $10a1$ to $10aN$ are divided into a first group and a second group. For example, the first group is a group corresponding to the original maximum temperature value $T_{max}$. In addition, the second group is a group corresponding to the new temperature value $T_{max\_new}$.

(S17) The temperature control unit 33 distributes the new temperature and the state for each search unit, which are supplied from the replica deletion unit 323, to the search units in each group. As a result, the new temperature, the state, and the local field are set in each search unit. The energy value corresponding to the state is calculated by the product-sum of the state and the local field in each search unit.

(S18) The overall control unit 34 causes the search units belonging to the first group and the temperature control unit 33 to perform the replica exchange process.

(S19) The overall control unit 34 causes the search units belonging to the second group and the temperature control unit 33 to perform the replica exchange process. Steps S18 and S19 are performed in parallel.

(S20) The overall control unit 34 determines whether or not the defined number of times of processing (a series of procedures of Steps S11 to S19) is performed. In a case where the defined number of times of processing is performed, the arithmetic operation process of the optimization device 2 is ended. In a case where the defined number of times of processing is not performed, the processing proceeds to Step S11.

When the arithmetic operation process is ended, the overall control unit 34 acquires the state from each of the search units $10a1$ to $10aN$ and obtains a solution to the optimization problem. For example, the overall control unit 34 outputs a state corresponding to the lowest energy reached by the search unit of each group, as a solution (optimum solution) to the optimization problem.

As described above, the replica deletion unit 323 divides the search units $10a1$ to $10aN$ into a plurality of groups. The plurality of groups include the first group including the search unit in which the maximum temperature value $T_{max}$ that is the maximum of temperature values set in the plurality of groups is set, and one or a plurality of second groups including the search unit in which the new temperature value $T_{max\_new}$ that is an update maximum temperature value is set.

The number of search units included in the first group among the search units $10a1$ to $10aN$ is obtained based on a value obtained by multiplying the number of search units $10a1$ to $10aN$ by a value obtained by dividing the logarithmic value of the maximum temperature value by the sum of the logarithmic value of the maximum temperature value and the logarithmic value of the update maximum temperature value (Expression (10)). In addition, the number of search units included in the second group among the search units $10a1$ to $10aN$ is obtained based on a value obtained by multiplying the number of search units $10a1$ to $10aN$ by a value obtained by dividing the logarithmic value of the update maximum temperature value by the sum of the logarithmic value of the maximum temperature value and the logarithmic value of the update maximum temperature value (Expression (11)). Step S11 may be executed once only for the first time, and Step S11 may be skipped for the second and subsequent times (in this case, the number of search units belonging to each of the plurality of groups is not updated).

In addition, the procedure of Steps S11 to S19 illustrated in FIG. 9 is repeated. That is, for example, the temperature adjustment unit 31 determines the update maximum temperature value based on a result of the ground state search performed by the search unit included in the first group. The replica grouping unit 32 corrects the temperature value set in the search unit included in the second group, based on the determined update maximum temperature value. Thus, the possibility that the appropriate update maximum temperature value is set for the second group is increased, and this contributes to improvement of solution accuracy.

In addition, as illustrated, the replica grouping unit 32 may update the number of search units included in the first group and the second group based on the update maximum temperature value which has been newly determined. With the update, the number of search units included in each group may increase or decrease. Thus, it is possible to set the appropriate number of replicas and the temperature range in accordance with the problem, and to further improve the solution accuracy.

Figure 10:
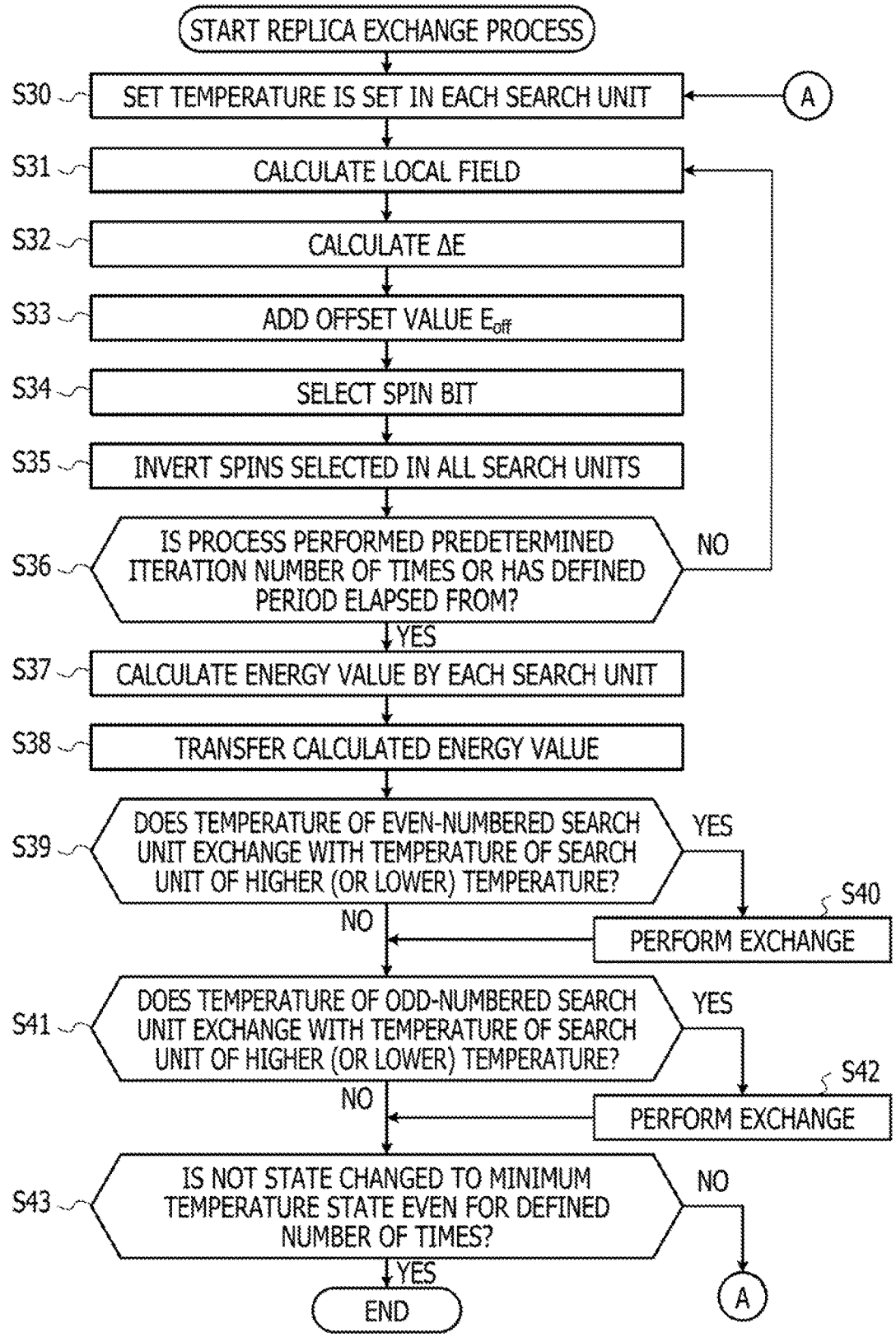
FIG. 10 is a flowchart illustrating an example of a replica exchange process.

FIG. 10 is a flowchart illustrating an example of the replica exchange process.

The replica exchange process corresponds to Steps S10, S18, and S19. A case where the search units $10a1$ to $10aN$ belong to the same group (case of Step S10) will be described below. However, in a case where the search units 10a1 to 10aN are divided into a plurality of groups, the temperature control unit 33 performs a procedure as follows for each group.

(S30) The temperature control unit 33 sets a temperature in each of the search units 10a1 to 10aN. The initial value of the temperature set in each of the search units 10a1 to 10aN is determined in advance in accordance with a problem or the like. In a case where a new temperature has been set for each search unit in Step S17, Step S30 may be skipped. In addition, in a case where the process proceeds to Step S30 through Steps S39 to S43, the temperature control unit 33 sets the temperature after the exchange, in the search units 10a1 to 10aN.

(S31) Each of the search units 10a1 to 10aN calculates the local field h for each spin bit. For example, focusing on the search unit 10a1, the h calculation units 12b1 to 12bn calculate the local fields $h_1$ to $h_n$. The local field h is calculated based on Expression (3). After the local field h is calculated by Expression (3), the updated local field h=h+δh may be obtained, for example, by adding a difference δh represented by Expression (4) to the local field h.

(S32) Each of the search units 10a1 to 10aN calculates an energy change value ΔE for each spin bit based on the calculated local field h. For example, focusing on the search unit 10a1, the ΔE generation units 12c1 to 12cn calculate the energy change values $\Delta E_1$ to $\Delta E_n$. ΔE is calculated based on Expression (2).

(S33) Each of the search units 10a1 to 10aN adds the offset value $E_{off}$ to the energy change value −ΔE. For example, focusing on the search unit 10a1, the adders 13a1 to 13an add the offset value $E_{off}$ to $-\Delta E_1$ to $-\Delta E_n$. The offset value $E_{off}$ is controlled by the offset control unit 13d as described above. For example, in a case where the flag which is output by the selector unit 13c and indicates whether or not the transition is possible indicates that the transition is not possible, the offset control unit 13d supplies the offset value $E_{off}$ greater than 0 to the adders 13a1 to 13an. In a case where the flag indicates that the transition is possible, the offset control unit 13d supplies the offset value $E_{off}$=0 to the adders 13a1 to 13an. The initial value of the offset value $E_{off}$ is 0.

(S34) Each of the search units 10a1 to 10aN selects a spin bit to be inverted among spin bits as inversion candidates. For example, focusing on the search unit 10a1, each of the state transition determination circuits 13b1 to 13bn outputs, to the selector unit 13c, the flag indicating whether or not the transition of a spin bit corresponding to the state transition determination circuit is possible. The selector unit 13c selects one of the input flags, and outputs the selected flag and index indicating a spin bit corresponding to the selected flag.

(S35) Each of the search units 10a1 to 10aN inverts the selected spin (spin bit). For example, focusing on the search unit 10a1, the state holding unit 11a updates the value of the spin bit indicated by index among the spin bits included in the state based on the flag output by the selector unit 13c and index.

(S36) Each of the search units 10a1 to 10aN determines whether or not the number of times of performing the process has reached a predetermined number of iterations or a defined period has elapsed from the start of the ground state search immediately after Step S30. In a case where the number of times of performing the process has reached the defined number of iterations, or the defined period has elapsed the process proceeds to Step S37. In a case where the number of times of performing the process has not reached the defined number of iterations, or the defined period has not elapsed, the process proceeds to Step S31.

(S37) Each of the search units 10a1 to 10aN calculates an energy value ($E_1$ to $E_N$) in the corresponding search unit.

(S38) Each of the search units 10a1 to 10aN transfers the calculated energy value to the temperature adjustment unit 31, the replica grouping unit 32, and the temperature control unit 33.

(S39) For an even-numbered search unit when the search units are arranged ascending order of temperature, the temperature control unit 33 determines whether or not to exchange the temperature of the even-numbered search unit with an adjacent search unit having a higher (or lower) temperature based on the exchange probability represented by Expression (7). The determination of temperature exchange is performed for each pair of search units. In a case where there is a pair of search units with which it is determined that the temperature is to be exchanged, the process proceeds to Step S40. In a case where there is no pair of search units with which it is determined that the temperature is to be exchanged, the process proceeds to Step S41.

(S40) The temperature control unit 33 exchanges the temperature in the pair of search units determined to exchange the temperature in Step S39. Specifically, the temperature control unit 33 updates, for example, the above-described second correspondence information held by the temperature control unit 33, in accordance with the temperature exchange.

(S41) For an odd-numbered search unit when the search units are arranged ascending order of temperature, the temperature control unit 33 determines whether or not to exchange the temperature of the odd-numbered search unit with an adjacent search unit having a higher (or lower) temperature based on the exchange probability represented by Expression (7). In a case where the temperature control unit 33 determines in Step S39 whether or not to exchange the temperature of the even-numbered search unit with the search unit of the higher temperature, the temperature control unit 33 determines in Step S41 whether or not to exchange the temperature of the odd-numbered search unit with the search unit of the higher temperature. In a case where the temperature control unit 33 determines in Step S39 whether or not to exchange the temperature with the search unit of the lower temperature for the even-numbered search unit, it determines in Step S41 whether or not to exchange the temperature of the odd-numbered search unit with the search unit of the lower temperature. In a case where there is a pair of search units with which it is determined that the temperature is to be exchanged, the process proceeds to Step S42. In a case where there is no pair of search units with which it is determined that the temperature is to be exchanged, the process proceeds to Step S43.

(S42) The temperature control unit 33 exchanges the temperature in the pair of search units determined to exchange the temperature in Step S41. Specifically, the temperature control unit 33 updates the second correspondence information held by the temperature control unit 33, in accordance with the temperature exchange.

(S43) The overall control unit 34 acquires the state from each of the search units 10a1 to 10aN, and determines whether or not there is no change in the state in the search unit at the minimum temperature a specified number of times. In a case where there is no change in the state in the search unit at the minimum temperature, the replica exchange process is ended. In a case where there is a change in the bit state in the search unit at the minimum temperature, the overall control unit 34 causes the process to proceed to Step S30 and continues the ground state search.

The procedure of Steps S39 to S42 may be considered as processing performed by the exchange control unit included in the temperature control unit 33. In addition, as described in the first embodiment, in the optimization device 2, the exchange control unit may be provided separately from the temperature control unit 33. Further, the order of even and odd numbers in Steps S39 and S41 may be reversed.

As described above, the optimization device 2 may continue the optimization operation using the update maximum temperature while updating the maximum temperature calculated from the optimization result. In addition, the optimization device 2 may normally monitor the maximum temperature that changes as the optimization proceeds, by leaving the system of the initial maximum temperature $T_{max}$. Accordingly, monitoring is performed without adding additional hardware (for example, another one optimization device). In addition, the optimization device 2 may search for a solution at a high speed by adjusting the temperature in the system of the calculated maximum temperature $T_{max\_new}$.

More specifically, the optimization device 2 performs search using a plurality of temperature ranges in parallel, by performing the ground state search with the replica exchange method in each of the plurality of groups. Therefore, in a certain group, it is possible to increase the possibility that a temperature range and the number of replicas, which are appropriate for a target problem are obtained, and to improve solution accuracy. In addition, it is possible to reduce the time to arrive at a solution. In this manner, it is possible to improve the solving performance.

In particular, the optimization device 2 may update the new temperature value $T_{max\_new}$ and the number of replicas in the other groups based on the result of the ground state search in the group corresponding to the initial temperature range. Therefore, even when the value of $T_{max\_new}$ previously determined is not appropriate, it is possible to correct the value of $T_{max\_new}$ to an appropriate value. Accordingly, in the other group, it is possible to increase the possibility that the temperature range appropriate for the target problem is set, and to improve the solution accuracy. In addition, it is possible to reduce the time to arrive at a solution. In this manner, it is possible to improve the solving performance According to the optimization device 2, it is possible to set an appropriate temperature and obtain a solution with high accuracy without adding hardware resources.

Third Embodiment

Next, a third embodiment is described. Items different from the second embodiment described above will be mainly described, and descriptions of the common items will be omitted.

In the second embodiment, an example in which the state and the temperature value to be set in the search unit of each group are determined based on the exchange probability has been described. In the third embodiment, an example in which the state and the temperature value to be set in the search unit of each group are determined by another method will be described.

A circuit configuration of the optimization device 2 in the third embodiment is similar to the circuit configuration in the second embodiment illustrated in FIG. 3. However, the circuit configuration of the replica grouping unit in the third embodiment is different from that in the second embodiment. The third embodiment will be described by using the example in which the search units 10a1 to 10aN are divided into two groups, but the search units 10a1 to 10aN may be divided into three or more groups.

Figure 11:
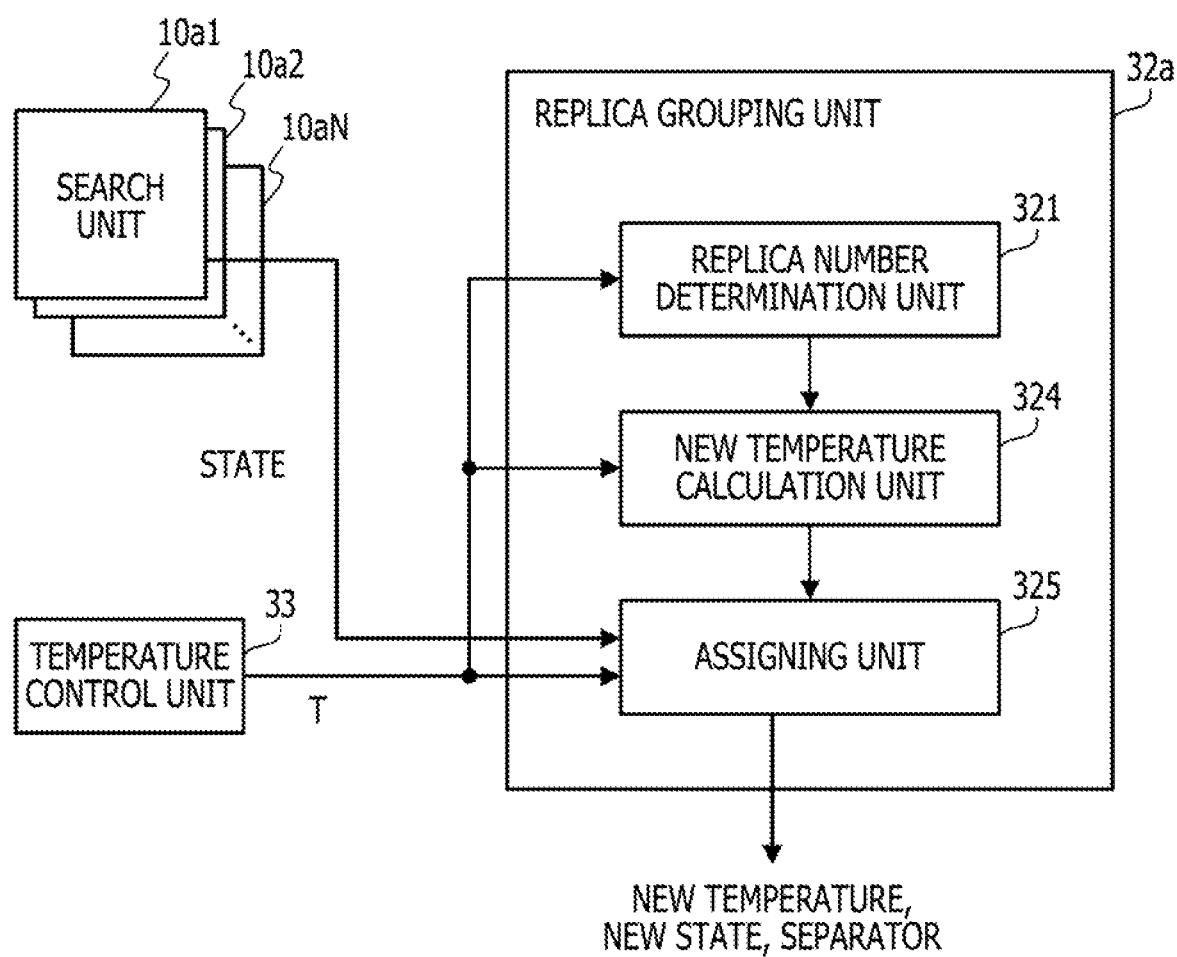
FIG. 11 is a diagram illustrating a circuit configuration example of a replica grouping unit according to a third embodiment.

FIG. 11 is a diagram illustrating a circuit configuration example of the replica grouping unit in the third embodiment.

A replica grouping unit 32a is provided in the optimization device 2 instead of the replica grouping unit 32. The replica grouping unit 32a includes a replica number determination unit 321, a new temperature calculation unit 324, and an assigning unit 325.

The replica number determination unit 321 determines the number of search units belonging to each group (the number of replicas in each group) by Expression (10) and Expression (11) based on the initial maximum temperature value $T_{max}$ and the new temperature value $T_{max\_new}$, and supplies the determined number of search units to the new temperature calculation unit 324.

The new temperature calculation unit 324 calculates a new temperature to be set in the search unit of each group, by Expression (8 and Expression (9).

Specifically, the new temperature calculation unit 324 calculates a temperature value (new temperature) to be set in each search unit belonging to the group corresponding to the maximum temperature value $T_{max}$, based on the initial maximum temperature value $T_{max}$. That is, the new temperature calculation unit 324 determines the temperature value of each search unit in the group from the number of search units of the group, which is supplied from the replica number determination unit 321 and the maximum temperature value $T_{max}$ such that the temperature values of the search units in the group have distances equal to each other on a logarithmic axis.

In addition, the new temperature calculation unit 324 calculates the temperature value (new temperature) to be set in each search unit belonging to the group corresponding to the new temperature value $T_{max\_new}$, based on the new temperature value $T_{max\_new}$ supplied from the temperature adjustment unit 31 or the temperature control unit 33. That is, the new temperature calculation unit 324 determines the temperature value of each search unit in the group from the number of search units in the group, which is supplied from the replica number determination unit 321, and the new temperature value $T_{max\_new}$ such that the temperature values of the search units in the group have distances equal to each other on the logarithmic axis.

The new temperature calculation unit 324 supplies the number of replicas in each group and the temperature value (new temperature) set in the search unit of each group, to the assigning unit 325.

The assigning unit 325 outputs information on a separator that divides the search units 10a1 to 10aN into a plurality of groups, to the temperature control unit 33 based on the number of replicas in each group. In addition, the assigning unit 325 outputs the new temperature and the new state set in the search unit of each group to the temperature control unit 33. Here, the temperature control unit 33 specifies the search unit in which the temperature value closest to the new temperature is currently set, acquires the state held by the search unit, and sets the acquired state as the new state to be set to the search unit in which the new temperature is set. The search unit in which the temperature value closest to the new temperature is set may be a search unit included in the same group as the group of the search unit as a setting destination of the new temperature, or may be a search unit included in a different group.

As described above, the replica grouping unit 32a calculates the temperature value set in each search unit belonging to the same group based on the temperature value determined by the temperature adjustment unit 31, for each group, such that natural logarithm values of the temperature values in the respective search units belonging to the same group have distances equal to each other. The replica grouping unit 32a selects values of a plurality of state variables to be handed over to search units belonging to each of the plurality of groups among values of the plurality of state variables in the search units 10a1 to 10aN, based on the calculated temperature value and the temperature value set in each of the search units 10a1 to 10aN.

Next, a processing procedure of the optimization device 2 using the replica grouping unit 32a will be described.

Figure 12:
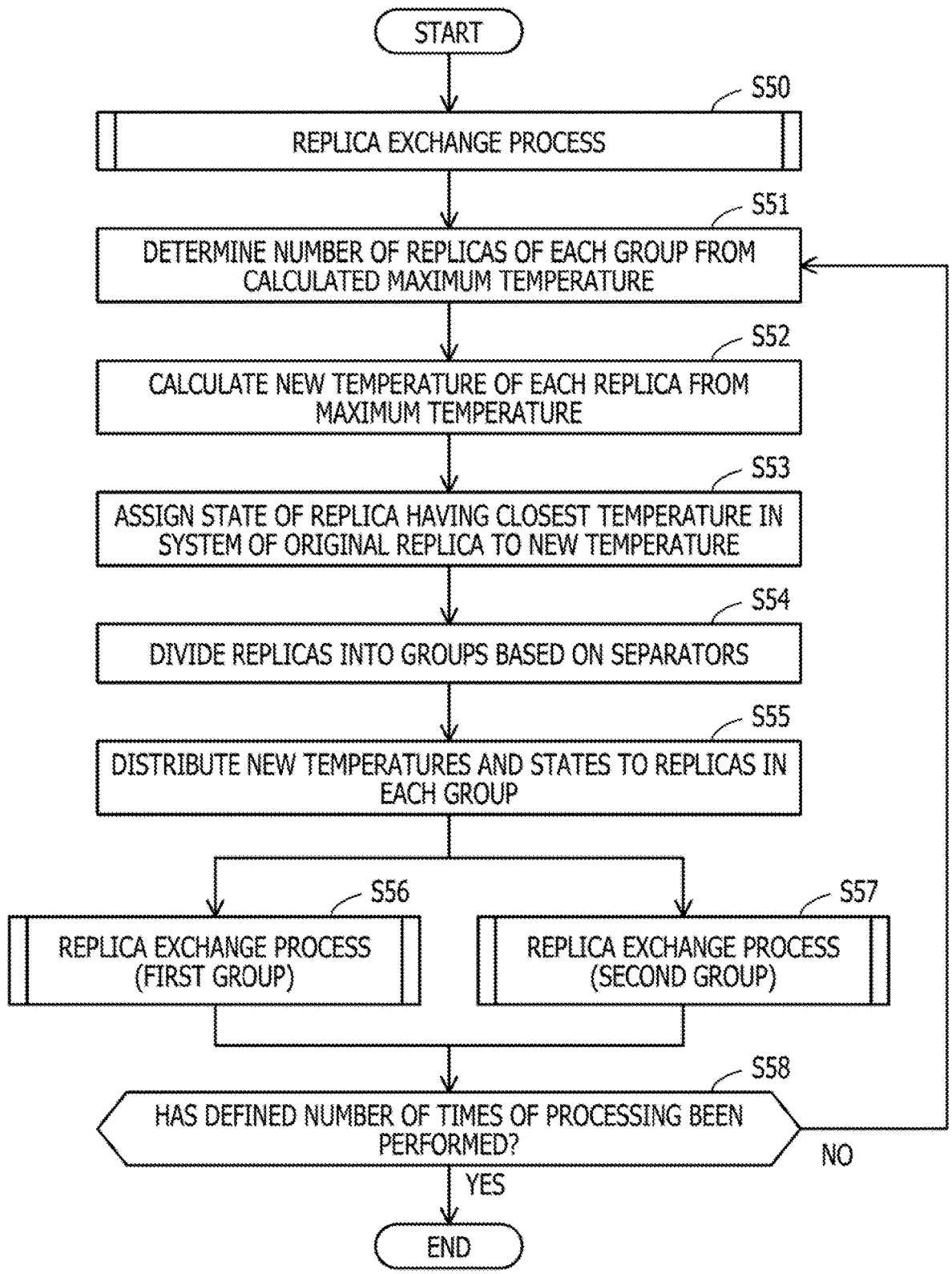
FIG. 12 is a flowchart illustrating a process example of the optimization device.

FIG. 12 is a flowchart illustrating a process example of the optimization device.

(S50) The overall control unit 34 causes the search units 10a1 to 10aN and the temperature control unit 33 to perform a replica exchange process. The search units 10a1 to 10aN and the temperature control unit 33 performs the first optimization operation using the replica exchange method under the control of the overall control unit 34. For example, initial values of various parameters input from the outside are set in the search units 10a1 to 10aN and the temperature control unit 33 through the overall control unit 34. The replica exchange process corresponds to the procedure in FIG. 10.

(S51) The temperature adjustment unit 31 calculates the maximum temperature (new temperature value $T_{max\_new}$) based on the first optimization result. For example, the method illustrated in FIGS. 4 and 5 may be used as a calculation method. The replica number determination unit 321 determines the number of replicas in each group, from the calculated maximum temperature. For example, the replica number determination unit 321 may use Expression (10) and Expression (11) to determine the number of replicas. Here, the number of groups is set in advance in the optimization device 2. In this example, the number of groups is 2.

(S52) The new temperature calculation unit 324 calculates the new temperature of each replica (corresponding to the search unit) from the calculated maximum temperature (new temperature value $T_{max\_new}$) and the original maximum temperature $T_{max}$ by Expression (8) and Expression (9) for each group.

(S53) The assigning unit 325 assigns, to the new temperature, the state of the replica having the closest temperature in the original replica system (that is, group). The assigning unit 325 outputs a separator for dividing the search units 10a1 to 10aN into a plurality of groups to the temperature control unit 33, and outputs the new temperature value and the state (including a local field) set in each search unit to the temperature control unit 33 for each group.

(S54) The temperature control unit 33 divides the search units 10a1 to 10aN into a plurality of groups based on the separator supplied from the assigning unit 325. Here, the search units 10a1 to 10aN are divided into a first group and a second group. For example, the first group is a group corresponding to the original maximum temperature value $T_{max}$. In addition, the second group is a group corresponding to the new temperature value $T_{max\_new}$.

(S55) The temperature control unit 33 distributes the new temperature and the state for each search unit, which are supplied from the assigning unit 325, to the search units in each group. As a result, the new temperature, the state, and the local field are set in each search unit. The energy value corresponding to the state is calculated by the product-sum of the state and the local field in each search unit.

(S56) The overall control unit 34 causes the search units belonging to the first group and the temperature control unit 33 to perform the replica exchange process.

(S57) The overall control unit 34 causes the search units belonging to the second group and the temperature control unit 33 to perform the replica exchange process. Steps S56 and S57 are performed in parallel. The replica exchange process in Steps S55 and S57 corresponds to the procedure in FIG. 10 (the procedure in FIG. 10 is performed for each group).

(S58) The overall control unit 34 determines whether or not the defined number of times of processing (a series of procedures of Steps S51 to S57) is performed. In a case where the defined number of times of processing is performed, the arithmetic operation process of the optimization device 2 is ended. When the arithmetic operation process is ended, the optimization device 2 outputs the state of the lowest energy reached by each search unit as a solution. In a case where the defined number of times of processing is not performed the processing proceeds to Step S51.

As described above, the optimization device 2 may calculate the new temperatures for the search units belonging to each group by the same method as the method of determining the initial set temperatures for the search units 10a1 to 10aN such that the new temperatures have distances equal to each other on the logarithmic axis.

In the second and third embodiments, an example in which the search units 10a1 to 10aN are divided into two groups has been described. The search units 10a1 to 10aN may be divided into three or more groups. For example, it is considered that the optimization device 2 receives an input of the number m of candidates for the maximum temperature to be tested from the outside and increases the number of divided groups in accordance with the number m of candidates.

In this case, the temperature adjustment unit 31 outputs a plurality of candidate values (m new temperature values) $\{T_{max\_new}\}=\{T_1, T_2, \ldots, T_m\}$ of the maximum temperature based on the information obtained by the ground state search. In one example, it is considered that, when m=3, the temperature adjustment unit 31 may set a temperature value $t_p$ of the peak p1 of the temperature histogram 70 illustrated in FIGS. 5A and 5B and temperature values $t_p+\sigma$ and $t_p-\sigma$ ($\sigma$ is the standard deviation of the temperature histogram 70), as candidates for the maximum temperature. In this case, the replica grouping unit 32 divides the search units 10a1 to 10aN into four (m+1=3+1=4) groups. When the number of the search units 10a1 to 10aN is set to $N_{max}$, the number of replicas of each group in which the original maximum temperature value $T_{max}$ and the m new temperature values are set as the maximum temperatures is represented by Expression (12).

[Math. 12]

$$\begin{cases} N_{Tmax} = N_{max} \cdot \dfrac{\log(T_{max})}{\log(T_{max}) + \log(T_1) + \cdots + \log(T_m)} \\ N_{T1} = N_{max} \cdot \dfrac{\log(T_1)}{\log(T_{max}) + \log(T_1) + \cdots + \log(T_m)} \\ \quad\vdots \\ N_{Tm} = N_{max} \cdot \dfrac{\log(T_m)}{\log(T_{max}) + \log(T_1) + \cdots + \log(T_m)} \end{cases} \quad (12)$$

As described above, the optimization device 2 may divide the search units 10a1 to 10aN into three or more groups. For example, immediately before Step S10 in FIG. 9 or Step S50 in FIG. 12, the overall control unit 34 may receive an input of the number m of candidates by the user and set the number m of candidates in the replica grouping unit 32. In this case, in Step S11 of FIG. 9 or Step S51 of FIG. 12, the replica number determination unit 321 may determine the number of replicas in each group based on the set number m of candidates and Expression (12).

Fourth Embodiment

Next, a fourth embodiment will be described. Items different from the second and third embodiments described above will be mainly described, and descriptions of the common items will be omitted.

In the second and third embodiments, an example in which the optimization device 2 is realized by a semiconductor integrated circuit such as an FPGA has been described, but other hardware configurations are also conceivable as the optimization device 2.

Figure 13:
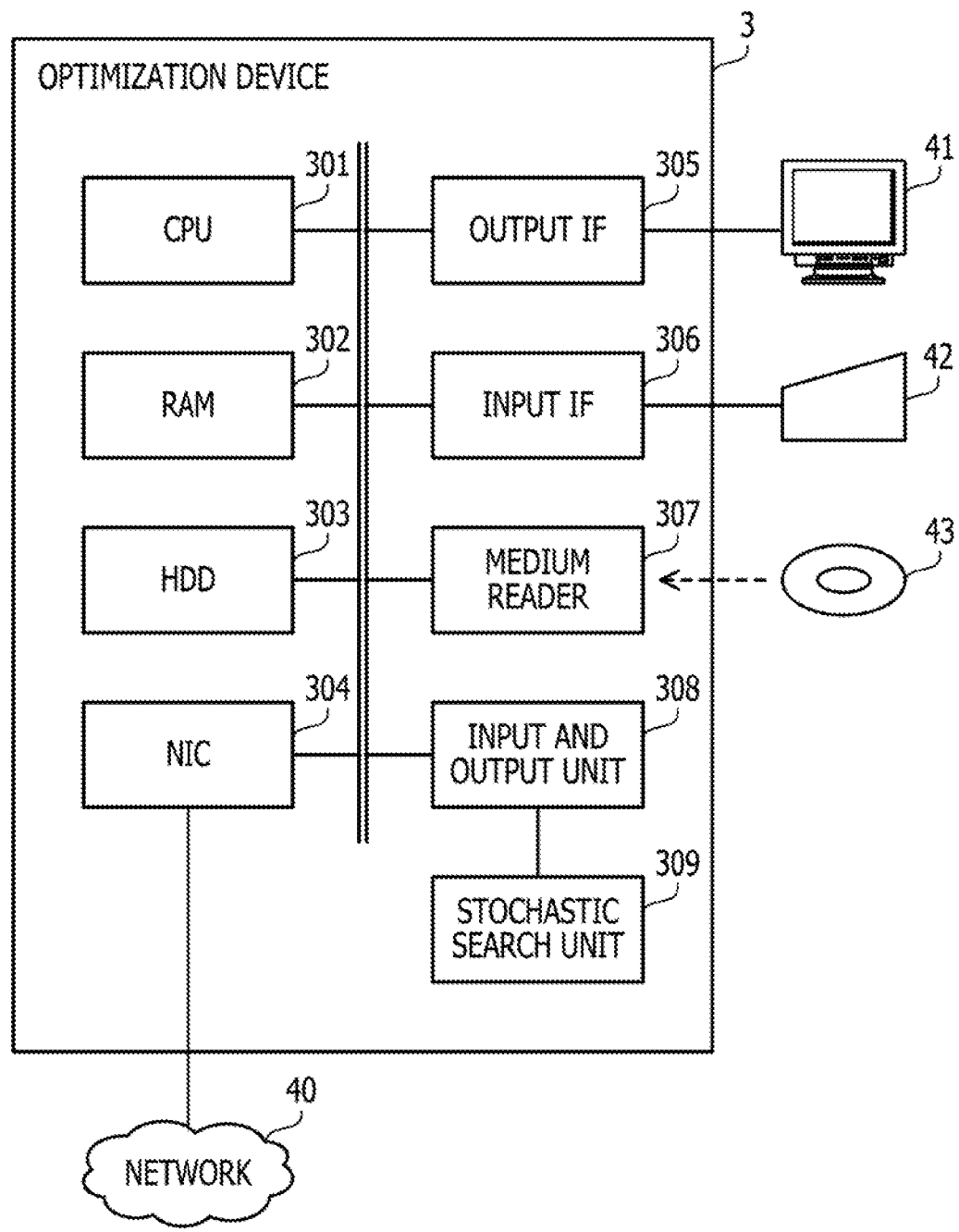
FIG. 13 is a diagram illustrating a hardware example of an optimization device according to a fourth embodiment.

FIG. 13 is a diagram illustrating a hardware example of an optimization device according to a fourth embodiment.

An optimization device 3 includes a central processing unit (CPU) 301, a random-access memory (RAM) 302, a hard disk drive (HDD) 303, a network interface card (NIC) 304, an output interface (IF) 305, an input IF 306, a medium reader 307, an input and output unit 308, and a stochastic search unit 309. The pieces of hardware of the optimization device 3 are coupled to a bus of the optimization device 3.

The CPU 301 is a processor that executes a program command. The CPU 301 loads at least a portion of a program or data stored in the HDD 303 into the RAM 302 and executes the program. The CPU 301 may include a plurality of processor cores. In addition, the optimization device 3 may include a plurality of processors. A set of the plurality of processors may be referred to as a "multiprocessor" or simply a "processor". For example, the CPU 301 may realize the functions of the temperature adjustment unit 31, the replica grouping unit 32, and the overall control unit 34 by processing of software (control program) executed by the CPU 301. In addition, the function of the temperature control unit 33 may also be realized by the CPU 301.

The RAM 302 is a volatile semiconductor memory that temporarily stores a program executed by the CPU 301 or data used for an arithmetic operation by the CPU 301. The optimization device 3 may include a type of memory other than the RAM, and may include a plurality of memories.

The HDD 303 is a non-volatile storage device that stores software programs such as an operating system (OS), middleware, application software, and the like and data. The optimization device 3 may include other types of storage devices such as a flash memory and a solid state drive (SSD), and may include a plurality of non-volatile storage devices.

The NIC 304 is an interface that is coupled to a network 40 and communicates with another computer via the network 40. The NIC 304 is coupled to a communication device such as a switch or a router by a cable, for example. The NIC 304 may be coupled to the network 40 by a wireless link.

The output IF 305 outputs an image to a display 41 coupled to the optimization device 3 in accordance with a command from the CPU 301. Any type of display such as a cathode ray tube (CRT) display, a liquid crystal display (LCD), a plasma display, or an organic electro-luminescence (OEL) display may be used as the display 41.

The input IF 306 acquires an input signal from an input device 42 coupled to the optimization device 3 and outputs the input signal to the CPU 301. A pointing device such as a mouse, a touch panel, a touch pad, or a trackball, a keyboard, a remote control unit, a button switch, or the like may be used as the input device 42. In addition, a plurality of types of input devices may be coupled to the optimization device 3.

The medium reader 307 is a reading device that reads a program or data stored in a recording medium 43. For example, a magnetic disk, an optical disk, a magneto-optical (MO) disk, or a semiconductor memory may be used as the recording medium 43. The magnetic disk includes a flexible disk (FD) and an HDD. The optical disk includes a compact disc (CD) and a digital versatile disc (DVD).

For example, the medium reader 307 copies the program or data read from the recording medium 43 into another recording medium such as the RAM 302 or the HDD 303. For example, the read program is executed by the CPU 301. The recording medium 43 may be a portable recording medium and is used to distribute the program and the data in some cases. In addition, the recording medium 43 and the HDD 303 may be referred to as computer-readable recording media in some cases.

The input and output unit 308 is coupled to the stochastic search unit 309 and controls data input from the CPU 301 to the stochastic search unit 309 and data output from the stochastic search unit 309 to the RAM 302 and the CPU 301.

The stochastic search unit 309 is an accelerator that performs an operation on a combinatorial optimization problem by hardware with the replica exchange method. The stochastic search unit 309 includes the search units 10a1 to 10aN and the temperature control unit 33, and performs stochastic search of searching for the ground state of the Ising model in accordance with the above-described procedure in FIGS. 9 and 10 (or FIGS. 12 and 10).

With the optimization device 3, it is possible to realize the functions similar to those of the optimization device 2.

Figure 14:
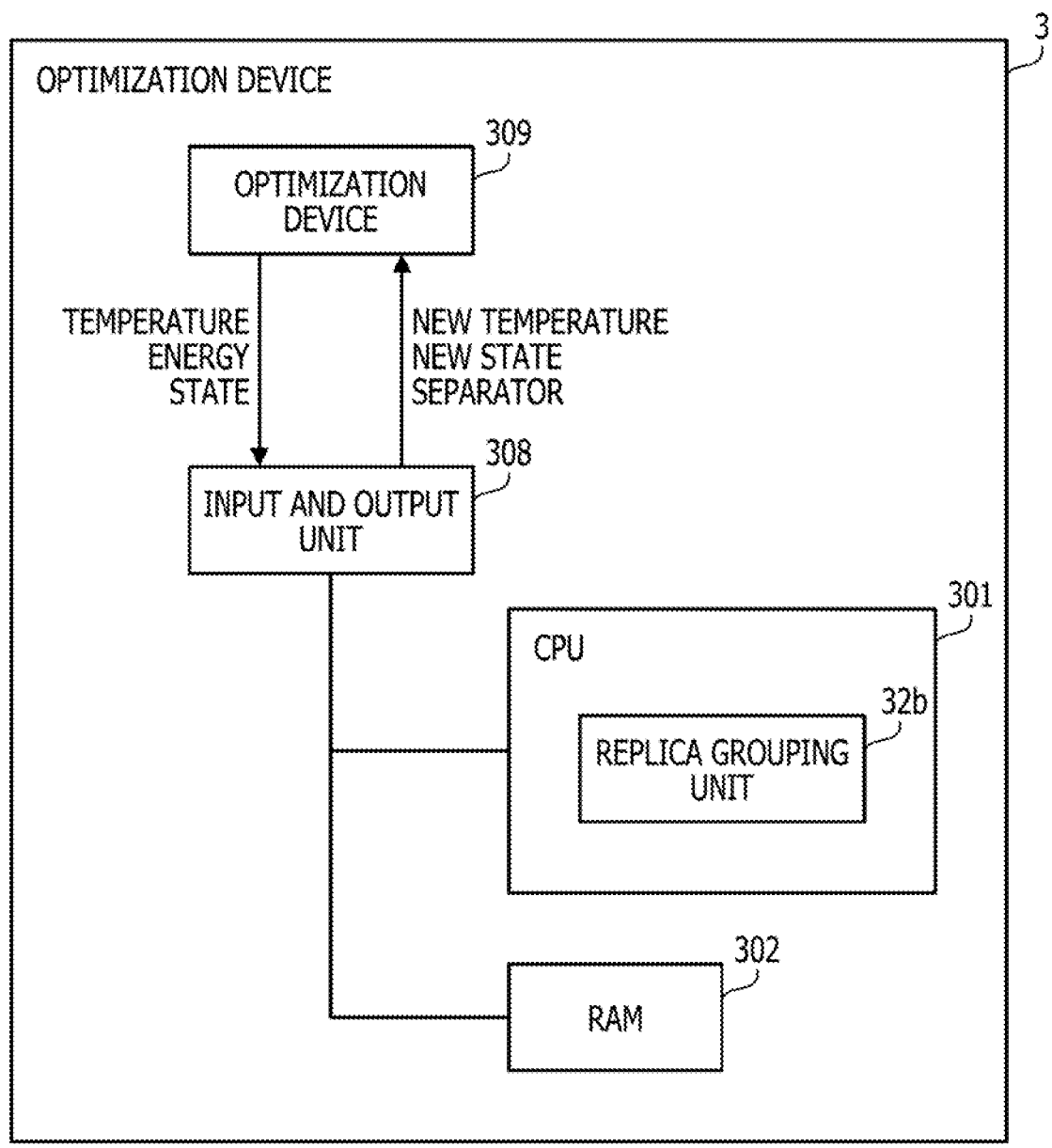
FIG. 14 is a diagram illustrating a function example of the optimization device.

FIG. 14 is a diagram illustrating a function example of the optimization device.

The CPU 301 exhibits the function of a replica grouping unit 32b by executing a program stored in the RAM 302.

The replica grouping unit 32b corresponds to the replica grouping unit 32 or the replica grouping unit 32a described above. The replica grouping unit 32b acquires the temperature, the energy, and the state of each search unit from the stochastic search unit 309 through the input and output unit 308. Thus, the replica grouping unit 32b determines the number of search units belonging to each group, the temperature value to be set in the search unit, and the state by a method similar to the replica grouping unit 32 or the replica grouping unit 32a. The replica grouping unit 32b outputs a separator for dividing the plurality of search units in the stochastic search unit 309 into a plurality of groups, and a new temperature and a new state set in the search unit of each group, to the stochastic search unit 309 through the input and output unit 308.

As described above, the function of the replica grouping unit 32b may be realized by the CPU 101. According to the optimization device 3, it is possible to improve the solution accuracy as in the optimization device 2.

In the second to fourth embodiments, an example (FIGS. 5A and 5B) in which the new temperature value $T_{max\_new}$ is obtained by the temperature histogram 70 or the cumulative histogram 80 obtained by the ground state search in the temperature adjustment unit 31 has been described, but another temperature adjustment method may be used. For example, a temperature adjustment method as follows may be considered.

Figure 15:
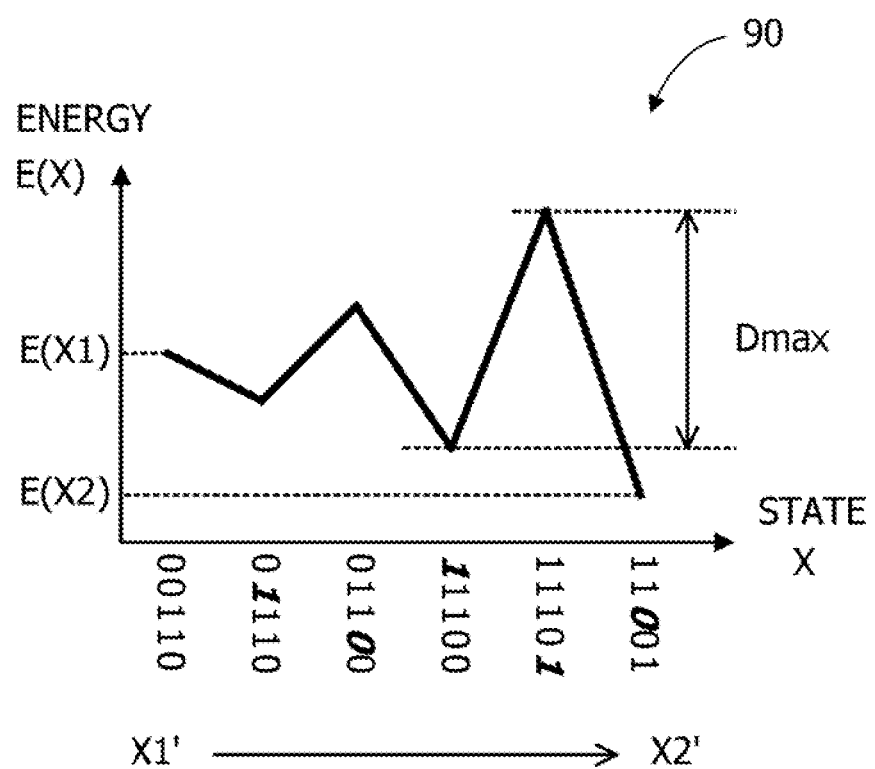
FIG. 15 is a diagram illustrating another example of temperature adjustment method.

FIG. 15 is a diagram illustrating another example of the temperature adjustment method.

The temperature adjustment unit 31 acquires a plurality of local solutions from the search units 10a1 to 10aN, as the first optimization operation result. The temperature adjustment unit 31 sorts the plurality of local solutions in ascending order (or descending order) of the corresponding energy values. The temperature adjustment unit 31 obtains an increase value of each energy value corresponding to each of the plurality of states obtained in the process of changing the spin bit by one bit, from the local solution having larger energy to the local solution having smaller energy. Thus, the temperature adjustment unit 31 calculates the new temperature value $T_{max\_new}$ by Expression (13) based on the maximum increase value Dmax (the maximum energy barrier separating the local solutions from each other) among increase values of the energy values.

[Math. 13]

$$T_{max\_new} = -\frac{Dmax}{\log(A)} \quad (13)$$

Here, the transition allowance probability A in Expression (13) is set in advance in the temperature adjustment unit 31 as a probability of allowing the state transition in which the energy change ΔE=Dmax. The temperature adjustment unit 31 recalculates the new temperature value $T_{max\_new}$ from the optimization operation result of the group corresponding to the second and subsequent maximum temperature values $T_{max}$, in the similar manner.

For example, the temperature adjustment unit 31 acquires local solutions X1, X2, . . . and the energy values corresponding to the respective local solutions, from the search units 10a1 to 10aN as the first optimization operation result. The local solution X is represented by n spin bits. In addition, it is assumed that E(X1) is the next largest to E(X2) with respect to the local solutions X1, X2, . . . .

For example, it is assumed that the number of different bits between the local solution X1 and the local solution X2 is 5. A bit set obtained by extracting bits different from the local solution X2 from the local solution X1 is represented by X1'. A bit set obtained by extracting bits different from the local solution X1 from the local solution X2 is represented by X2'. As an example, a case where X1'="00110" and X2'="11001" is considered. Bits of the same digit in the bit sets X1' and X2' are bits of the same digit in the local solutions X1 and X2.

A sequence 90 illustrates the maximum increase value Dmax among the increase values of the energy values corresponding to a plurality of the state variables obtained by changing the state variables corresponding to the local solutions X1 and X2 by one bit. For example, the temperature adjustment unit 31 changes the bits of the local solution X1, which are different from those of the local solution X2, by one bit to simulate the transition from the local solution X1 to the local solution X2. The temperature adjustment unit 31 calculates the energy change ΔE when the energy is changed by one bit with respect to the change in each bit, based on Expression (2) and Expression (3).

In the example of the sequence 90, since the number of different bits between the local solutions X1 and X2 is 5, the temperature adjustment unit 31 changes the bits five times and obtains 5 pieces of ΔE in the process. At this time, the temperature adjustment unit 31 may select a bit to be changed the next by a greedy algorithm or randomly. In the greedy method, the temperature adjustment unit 31 selects a bit having the minimum ΔE among bits to be change candidates.

For example, the temperature adjustment unit 31 sequentially changes X1'="00110" by one bit to obtain bit sets of "01110", "01100", "11100", "11101", and X2'="11001". In the notation of the bit sets, the notation of bits other than X1' in the local solution X1 and the notation of bits other than X2' in the local solution X2 are omitted. The temperature adjustment unit 31 calculates ΔE for each bit change. It is assumed that, among the exemplified bit changes, ΔE when the bit set changes from "11100" to "11101" is the maximum increase value Dmax in the sequence 90. The temperature adjustment unit 31 calculates a new temperature value $T_{max\_new}$ by Expression (13) with max (ΔE)=Dmax for the sequence 90.

When $T_{max\_new}$ is equal to or smaller than 0 (that is, in a case of Dmax≤0), the temperature adjustment unit 31 does not update the new temperature value $T_{max\_new}$.

When two local solutions X1 and X2 are provided, the temperature adjustment unit 31 may obtain the new temperature value $T_{max\_new}$ from the local solutions X1 and X2. In a case where the number of local solutions is three or more, the temperature adjustment unit 31 simulates the transition from the second local solution to the first local solution with respect to the first local solution and the second local solution having the next largest energy after the first local solution, and obtains the maximum ΔE (maximum energy increase value) in the process of the transition. Thus, the temperature adjustment unit 31 calculates candidate values for $T_{max\_new}$ regarding the transition from the second local solution to the first local solution. The temperature adjustment unit 31 determines the maximum value among the candidate values for $T_{max\_new}$ obtained in this manner for each set of two local solutions, as the new temperature value $T_{max\_new}$. The temperature adjustment unit 31 may determine an average value of the candidate values for $T_{max\_new}$ obtained for each set of two local solutions, as the new temperature value $T_{max\_new}$.

As described above, the temperature adjustment unit 31 may acquire a plurality of local solutions or the maximum energy increase value obtained by tracing the state transition between the local solutions, as the information obtained by the ground state search and the temperature adjustment unit may calculate the new temperature value $T_{max\_new}$ based on the acquired information.

Each component of the optimization device 1 in the first embodiment may be realized by an electronic circuit. Therefore, the search units 1a1 to 1aN and the control unit 20 of the optimization device 1 may be referred to as search circuits and a control circuit, respectively. The state holding unit 11, the energy calculation unit 12, and the transition control unit 13 may be referred to as a state holding circuit, an energy calculation circuit, and a transition control circuit, respectively. The temperature adjustment unit 21, the selection unit 22, the temperature control unit 23, and the exchange control unit 24 may be referred to as a temperature adjustment circuit, a selection circuit, a temperature control circuit, and an exchange control circuit, respectively.

In addition, each component of the optimization device 2 in the second and third embodiments may also be realized by an electronic circuit. Therefore, the components of the optimization device 2 may be referred to as a state holding circuit, an h calculation circuit, a ΔE generation circuit, a selector circuit, a ΔE calculation circuit, a temperature adjustment circuit, a replica grouping circuit, a temperature control circuit, an exchange control circuit, and an overall control circuit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
    a plurality of search circuits; and
    a control circuit coupled to the plurality of search circuits and that controls the plurality of search parts circuits each including
        a state holding circuit configured to hold each of values of a plurality of state variables included in an evaluation function representing an energy value,
        an energy calculation circuit configured to calculate a change value of the energy value generated in a case where any one of the values of the plurality of state variables is changed, and
        a transition control circuit configured to stochastically determine whether or not to accept a state transition by a relative relation between the change value of the energy value and thermal excitation energy, based on a set temperature value, the change value, and a random number value,
    the control circuit includes:
        a temperature adjustment circuit configured to determine an update maximum temperature value based on information obtained by a ground state search in the plurality of search circuits,
        a selection circuit configured to divide the plurality of search circuits into a plurality of groups including at least a first group and a second group, based on the determined update maximum temperature value,
        a temperature control circuit configured to set the temperature value in a search circuit belonging to each of the plurality of groups, and
        an exchange control circuit configured to exchange the temperature values or the values of the plurality of state variables among search circuit belonging to the same group, after the ground state search for the energy value is performed a repetitive number of times or after a predetermined period has elapsed from the ground state search for the energy value, the temperature adjustment circuit determines the update maximum temperature value based on a result of the ground state search performed by the search circuit included in the first group, and the selection circuit determines the temperature value set in the search circuit included in the second group, based on the determined update maximum temperature value.

2. The optimization device according to claim 1, wherein the first group includes a search circuit in which a maximum temperature value that is a maximum among the temperature values set in the plurality of search circuits is set, and the second group includes a search circuit in which the update maximum temperature value is set.

3. The optimization device according to claim 2, wherein the number of search circuits included in the first group among the plurality of search circuits is obtained based on a value obtained by multiplying, by the number of the plurality of search circuits, a value obtained by dividing a logarithmic value of the maximum temperature value by a sum of a logarithmic value of the maximum temperature value and a logarithmic value of the update maximum temperature value, and the number of search circuits included in the second group among the plurality of search circuits is obtained based on a value obtained by multiplying, by the number of the plurality of search circuits, a value obtained by dividing the logarithmic value of the update maximum temperature value by the sum of the logarithmic value of the maximum temperature value and the logarithmic value of the update maximum temperature value.

4. The optimization device according to claim 2, wherein the update maximum temperature value is obtained based on a result obtained by the plurality of search circuits performing the ground state search a predetermined number of times.

5. The optimization device according to claim 1, further comprising:
    a calculation circuit configured to calculate an exchange probability for exchanging temperature values or the values of the plurality of state variables among the plurality of search circuits, based on the energy value and the temperature value in each of the plurality of search circuits, wherein the selection circuit selects the temperature value and the values of the plurality of state variables to be handed over to each search circuit belonging to each of the plurality of groups, among the temperature values and the values of the plurality of state variables in the plurality of search circuits, based on the temperature value determined by the temperature adjustment circuit and the exchange probability calculated by the calculation circuit.

6. The optimization device according to claim 1, wherein the selection circuit calculates the temperature value set in each search circuit belonging to the same group based on the temperature value determined by the temperature adjustment circuit, for each group, such that natural logarithm values of the temperature values in the respective search circuits belonging to the same group have equal distances, and selects the values of the plurality of state variables to be handed over to each search circuit belonging to each of the plurality of groups among the values of the plurality of state variables in the plurality of search circuits, based on the calculated temperature value and the temperature value set in each of the plurality of search circuits.

7. The optimization device according to claim 1, wherein the temperature adjustment circuit is configured to acquire temperature statistical information that is statistical information regarding a transition of the temperature value in each of the plurality of search circuits, and to determine the update maximum temperature value that is a maximum temperature value after an update, and is set in the search circuit belonging to each of the plurality of groups based on the acquired temperature statistical information.

8. A control method of an optimization device including a plurality of search circuits and a control circuit coupled to the plurality of search circuits that controls the plurality of search circuits, the control method comprising:
    holding each of values of a plurality of state variables included in an evaluation function representing energy value, by a state holding circuit included in each of the plurality of search circuits;

calculating a change value of the energy value generated in a case where any one of the values of the plurality of state variables is changed, by an energy calculation circuit included in each of the plurality of search circuits;

stochastically determining whether or not to accept a state transition by a relative relation between the change value of the energy value and thermal excitation energy, based on a set temperature value, the change value, and a random number value, by a transition control circuit included in each of the plurality of search circuits;

determining an update maximum temperature value based on information obtained by a ground state search in the plurality of search circuits, by a temperature adjustment circuit included in the control circuit;

dividing the plurality of search circuits into a plurality of groups including at least a first group and a second group, based on the determined update maximum temperature value, by a selection circuit included in the control circuit;

setting the temperature value in a search circuit belonging to each of the plurality of groups, by a temperature control circuit included in the control circuit;

exchanging the temperature values or the values of the plurality of state variables among search circuits belonging to the same group, after the ground state search for the energy value is performed a repetitive number of times or after a predetermined period has elapsed from the ground state search for the energy value, by an exchange control circuit included in the control circuit;

determining the update maximum temperature value based on a result of the ground state search performed by the search circuit included in the first group, by the temperature adjustment circuit; and determining the temperature value set in the search circuit included in the second group, based on the determined update maximum temperature value, by the selection circuit.

* * * * *